United States Patent [19]

Newman et al.

[11] 4,437,953
[45] Mar. 20, 1984

[54] PROCESS FOR SOLUTION CONTROL IN AN ELECTROLYTIC ZINC PLANT CIRCUIT

[75] Inventors: Oliver M. G. Newman, Moonah; David J. Palmer, Kingston Beach; Robert V. Pammenter, Lindisfarne, all of Australia

[73] Assignee: Electrolytic Zinc Company of Australasia Limited, Melbourne, Australia

[21] Appl. No.: 379,491

[22] Filed: May 18, 1982

[51] Int. Cl.$^3$ .............................................. C25C 1/16
[52] U.S. Cl. ................................................... 204/119
[58] Field of Search ........................................ 204/119

[56] References Cited
U.S. PATENT DOCUMENTS
3,979,266  9/1976  Fugleberg et al. ................. 204/119

*Primary Examiner*—R. L. Andrews
*Attorney, Agent, or Firm*—Larson and Taylor

[57] ABSTRACT

A process for controlling the water balance and the concentration of impurities in an electrolytic zinc plant circuit with which is operated at least one selective zinc precipitation (SZP) process plant which comprises one or more of the steps (a) a two-stage SZP process plant in which a compound containing calcium carbonate is used in the first-stage to precipitate portion of the zinc in incoming solution, and a compound R containing zinc oxide, preferably calcined zinc sulphide concentrate, is used to precipitate most of the remaining zinc;

(b) displacement of the zinc depleted solution associated with solids leaving the SZP process plant by solution drawn from the electrolytic zinc plant circuit, and (c) use of a compound R with a particular average particle size.

13 Claims, 1 Drawing Figure

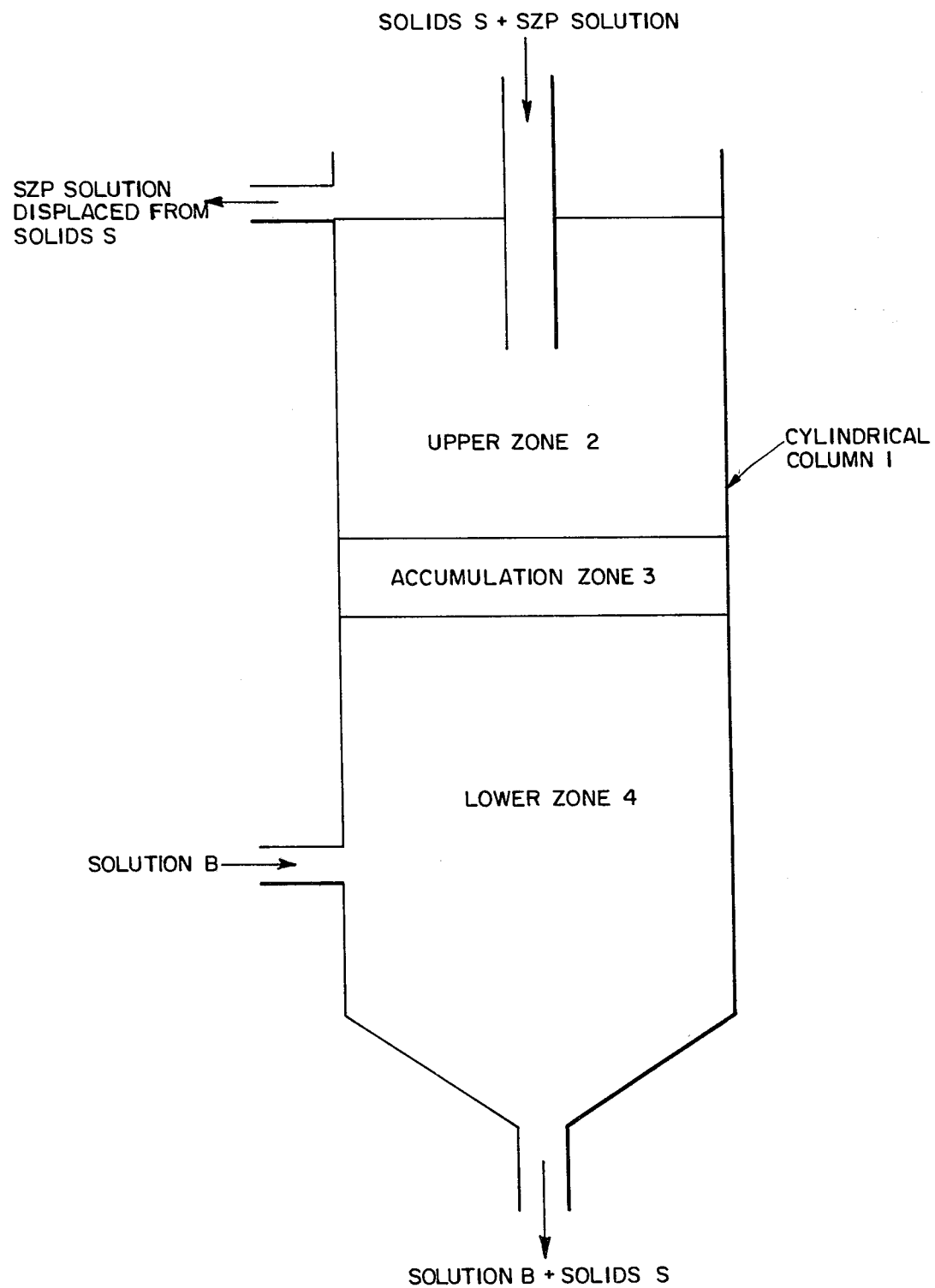

PROCESS FOR SOLUTION CONTROL IN AN ELECTROLYTIC ZINC PLANT CIRCUIT

This invention relates to a process for controlling the water balance and the concentration of impurities in an electrolytic zinc plant circuit.

The process of the invention includes selective zinc precipitation hereinafter referred to as SZP.

In one aspect the invention provides an improved process for controlling the water balance and the concentration of the impurities magnesium, manganese, chloride, sodium, and potassium in an electrolytic zinc plant circuit with which is operated at least one selective zinc precipitation (SZP) process plant which comprises one or more of the steps (a) a two-stage SZP process plant in which a compound containing calcium carbonate is used in the first-stage to precipitate portion of thwe zinc in incoming solution, and a compound R containing zinc oxide, preferably calcined zinc sulphide concentrate, is used to precipitate most of the remaining zinc.

(b) displacement of the zinc depleted solution associated with solids leaving the SZP process plant by solution drawn from the electrolytic zinc plant circuit, and (c) use of a compound R with an average particle size in the range 5 to 150 $\mu$m in the SZP process plant, more preferably with an average particle size in the range 7 to =$\mu$m.

In a further aspect the invention provides an improved process for controlling the water balance and the concentration of impurity I in an electrolytic zinc plant circuit in which zinc is precipitated from an aqueous solution A containing zinc sulphate using a compound R containing zinc oxide as the precipitant in a SZP process plant, thereby producing precipitated solids S containing basic zinc sulphate and a zinc depleted solution Y, the solids S being returned to the said circuit, and where the impurity I is a member of the group magnesium, manganese, chloride, sodium, and potassium, characterised by reducing the volume of zinc depleted solution Y returned daily to the said circuit in association with the solids S by a procedure incorporating at least one of the steps (a) to (c) as hereinafter defined, namely step (a) precipitating portion of the zinc present in solution A using a compound containing calcium carbonate as the precipitant in a SZP process plant to give a partially zinc depleted solution X1 containing at least 5 gram of zinc per liter which therefore requires subsequently less of the compound R containing zinc oxide to precipitate sufficient of the remaining zinc to achieve a concentration of less than 10 gram of zinc per liter in solution X2.

step (b) taking solids from a step in which zinc is precipitated in a SZP process plant into a solids-liquid separation system in which zinc depleted solution associated with the said solids is displaced by a solution B drawn from the said circuit, the solids-liquid separation system being drawn from the group (i) filtration with washing of the filter cake by solution B (ii) thickening with counter-current decantation ashing of the thickened solids by solution B, and (iii) settlement of the said solids into solution B which flows through the lower section of a solids transfer coumn.

step (c) the use of a compound R which has an average particle size in the range 5 to 150 $\mu$m.

The invention may include one or more of the following preferred features, providing a process as above in which

* the zinc depleted solution X2 associated with solids S is displaced by solution B.
* a zinc depleted solution is used for washing solids arising from the said circuit, thereby producing an aqueous wash solution with an increased zinc sulphate concentration, and in which greater than 10 percent of the said aqueous wash solution becomes solution A, thereby achieving at least a partially closed washing circuit.
* the compound R is preferentially formed fom input materials to the said circuit which have the highest concentration of impurity I.
* solution B contains in excess of 50 gram of zinc per liter.
* the partially zinc depleted solution X1 contains at least 10 gram of zinc per liter in order to minimise manganese precipitation in the first stage of the SZP process plant.
* the solution X2 contains less than 5 grams of zinc per liter in order to minimise the loss of dissolved zinc when solution X2 is discarded or used to wash solids from the electrolytic zinc plant circuit.
* the compound R has an average particle size in the range 7 to 32 $\mu$m more preferably with an average particle size of approximately 10 $\mu$m.
* the compound R has an average particle size in the range 0.5 to 50 $\mu$m, and in which the solids S are separated by a filtration method which compresses the said solids before disdcharge in order to minimise the amount of entrained SZP solution Y which is returned to the circuit.
* the compound is preferentially formed by roasting zinc concentrate in a manner such that the amount of compound R which reports in the bed of the roaster is increased, preferably such that the entire roasted product ultimatelyreports in the bed of the roaster.

BACKGROUND OF THE INVENTION

The amount of water that can be used in an electrolytic zinc plant circuit for washing residues and solids is presently limited by the amount of solution washed from the solids (hereinafter termed wash solution) which can be returned to the said cicuit. "Circuit" is hereinafter defined to be an electrolytic zinc plant circuit which may include effluent treatment and water recovery plants but does not include SZP process plants as hereinafter defined. The wash solution must be returned to the circuit or else the zinc values contained, primarily present in the said wash solution as zinc sulphate, are lost. If an excessive amount of wash solution is returned to the circuit, the water balance is no longer satisfactory. A satisfactoy water balance is one where the amount of water entering the circuit in was solution or from other sources equals in total the amount lost from the circuit. As has been stated by D. M. Liddell ("Handbook of Nonferrous Metallurgy Recovery of the Metals", second edition, McGraw-Hill Book Co., Inc., New York, 1945, page 405 at lines 10-12):

"The amount of wash water that can be used is limited by the moisture carried out in the residue and evaporation throughout the plant, unless some solution is discarded for other reasons".

An example of a residue washing circuit for an electrolytic zinc plant is given by G. D. Van Arsdale ("Hydrometallurgy of Base Metals", first edition, McGraw-Hill Book Co., Inc., New York, 1953, page 101).

If residues or products are not washed efficiently to displace entrained dissolved zinc with the amount of water available under conditions where the water balance is satisfactory, then either this inefficiency must be accepted, or alternatively, more water must be eliminated from the cicuit by additional evaporation or solution discard, to enable more wash water to be used.

Additional evaporation requires a large input of heat which is both undesirable and costly.

Two methods are known from the prior art for removing zinc values from solutions to give zinc depleted solutions suitable for discard.

The first method is termed "spent stripping" where portion of the spent electrolyte from the electrowinning step of the electrolytic zinc process is electrolysed further to reduce its zinc content. The resultant solution still has a significant zinc concentration and a high sulphuric acid concentration. The cost of treating this effluent to legislative limits is therefore high.

The second method depends upon precipitating zinc from the aqueous zinc sulphate solution to be discarded as a basic compound which is capable of subsequent use as a neutralizing agent in an electrolytic zinc plant circuit. Australian Pat. No. 429,078 discloses that a basic zinc sulphate can be precipitated selectiely from a solution of aqueous zinc sulphate with a variety of precipitants at temperatures in the range 40° C. to the boiling point of the solution at atmospheric pressure: calcined zinc sulphide concentrate (hereinafter termed calcine) and limestone (calcium carbonate) are among the precipitants specified in the patent. A paper printed in Metallurgical Transactions B published by the American Society for Metals and the Metallurgical Society of A.I.M.E., Volume 11B, March 1980, pages 73–82, discloses that basic zinc sulphate is considered to be precipitated by these two precipitants according to equations of the type

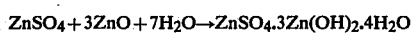

$$ZnSO_4 + 3ZnO + 7H_2O \rightarrow ZnSO_4 \cdot 3Zn(OH)_2 \cdot 4H_2O$$

and

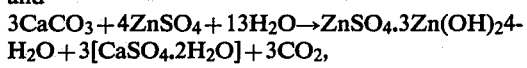

$$3CaCO_3 + 4ZnSO_4 + 13H_2O \rightarrow ZnSO_4 \cdot 3Zn(OH)_2 \cdot 4H_2O + 3[CaSO_4 \cdot 2H_2O] + 3CO_2,$$

respectively. As disclosed in Australian Pat. No. 429,078 zinc present in an aqueous solution of zinc sulphate can be precipitated under appropriate conditions as a basic zinc sulphate such that the latter has a lower content of undesirable ions. Thus the undesirable ions substantially remain in the treated zinc depleted solution. Accordingly the precipitation of the zinc as a basic zinc sulphate is selective and the process for using this precipitation reaction has been termed theSelective Zinc Precipitation(SZP) process. A number of undesirable ions are defined in the patent, of which magnesium, manganese, chloride, sodium, and potassium are of concern in the case of the present invention. For convenience any of the above undesirable ions are preferred to herein as impurity I. It must be understood that more than one of the above undesirable ions may be present in solutions treated by the SZP process and that the said process is capable of effecting control over each of the said undesirable ions present, although possibly to a differing degree. Thus the term "impurty I" may cover both one or a multiplicity of undesirable ions drawn from the group magnesium, manganese, chloride, sodium, and potassium. The treated zinc depleted solution arising from the SZP process is hereinafter termed SZP solution.

The SZP process is therefore capable of effecting control over both the water balance and the concentration of impurity I in the said circuit. The aforesaid paper describes in some detail two alternative methods of discarding the SZP solution remaining after removal of solids using a solids-liquid separation procedure. The first method is direct discard - see FIG. 1 of the paper. Although the SZP solution so discarded will be depleted in zinc, it will generally have concentrations of zinc and other non-ferrous metals in excess of the legislative limits applying to effluents from electrolytic zinc plants. The discarded solution will then require expensive additional treatment before discharge from the plant site. The second method is indirect discard and is accomplished by using the SZP solution remaining after removal of solids for washing solid residues which are removed from the circuit. Jarosite, goethite, and lead residue treatment process are examples of such solid residues. When such residues are washed by SZP solution, the latter displaces the mother liquor of high zinc concentration associated with the solid residues. Thus when the solid residues leave the circuit they contain significant amounts of impurity I via entrained SZP solution. Accordingly the concentration of impurity I in the said circuit can be effectively controlled. This second method of discard has the particular advantage of avoiding the need to process SZP solution in an effluent treatment plant. It thus satisfies the general aim of achieving zero discharge of effluents from metallurgical or manufacturing processes.

One attractive flowsheet incorporating this mwethod of discard is to decycle the wash solution produced by washing solid residues with SZP solution, back to the SZP process, that is, the wash solution becomes the feed solution to the SZP process. This particular flowsheet has been termed closed circuit washing and is shown in FIG. 2 of the paper.

The closed circuit flowsheet of FIG. 2 has a marked advantage with respect to water balance over the flowsheet of FIG. 1 incorporating direct discard. This is exemplified by examination of Table 1 below, which is a clarified version of Table V of the paper. The size of the SZP process plant is the amount of zinc in feed solution to the SZP process plant expressed as a percentage of the total amount of zinc extracted from calcine. Details of the specific design parameters used are set out in the paper.

Table I shows though that the steady-state magnesium concentration with closed circuit washing (FIG. 2) is higher than that for the flowsheet of FIG. 1, even though both are markedly below that for a circuit with no SZP process plant.

TABLE 1

| Type of flowsheet | | Size of SZP process plant (percent) | Zinc precipitant | Steady state magnesium concentration (gram/liter) | Net circuit input of water in m³/ 1000 kg of extracted zinc |
|---|---|---|---|---|---|
| Description | FIG. no. in paper | | | | |
| No SZP process plant | — | 0 | None | 53.0 | 0.195 |
| SZP process plant with direct discard | 1 | 5 | Limestone | 11.7 | 0.055 |
| SZP process plant with closed circuit washing | 2 | 5 | Limestone | 14.5 | −0.071 |
| SZP process plant with direct discard | 1 | 5 | Calcine | 13.3 | 0.309 |
| SZP process plant with closed circuit washing | 2 | 5 | Calcine | 16.0 | 0.160 |

The use of calcine instead of limestone as the precipitant of basic zinc sulphate is attractive as calcine is produced for subsequent leaching in most of the existing electrolytic zinc plant circuits and use of a portion in the SZP process plant does not preclude the subsequent extraction of its contained zinc content. Limestone has to be purchased for use in a SZP process plant and furthermore may remove far more than the desired amount of sulphate from the circuit: any such excess sulphate removal will have to be compensated for by addition of sulphate to the circuit. In most cases sulphuric acid will be the cheapest suitable source of sulphate, but even so its cost will be appreciable. Additionally the gypsum arising from the use of limestone in the SZP process plant will have to be disposed of and this may be difficult in practice. However, the substitution of calcine for limestone has an unacceptable adverse effect upon the water balance, as may be seen for either the flowsheet of FIGS. 1 or 2—see Table 1. This is due to the fact that (a) a large amount of calcine is required to precipitate, as basic zinc sulphate, 1 kg of dissolved zinc and
(b) the resultant mixture of basic zinc sulphate, calcine residue, and unconsumed calcine has a high moisture content when filtered and thus contains a high volume of entrained SZP solution: when thickened the said mixture again has a high volume of entrained SZP solution.

Consequently when the said mixture is returned to the circuit both factors (a) and (b) increase the volume of SZP solution returned to the circuit. For the flowsheet of FIG. 1, the water balance using calcine is, in fact, worse than that in the absence of any SZP process plant. Measures such as the use of filters with a squeeze action to lower the moisture content of the filter cake must be employed but these will often be inadequate to rectify the water balance. As expected the substitution of calcine for limestone also has an adverse effect upon the steady state magnesium concentration. This may be seen in Table 1, even though the limestone was assumed to contain 0.5% Mg.

One object of the present invention is to provide an improved procedure for substituting calcine for limestone, either wholly or in part, as the precipitant of basic zinc sulphate in the SZP process plant, such that the water balance is acceptable. Another objective is to obtain a steady state concentration of impurity I lower than that when using either limestone or calcine according to procedures of the prior art.

The drawing is a diagrammatic side elevation view of apparatus suitable for carrying out an embodiment of the invention.

DETAILED DESCRIPTION OF THE INVENTION

The applicants have found that when suitable ground calcine is used as the precipitant of basic zinc sulphate significant portions of the magnesium, chloride, sodium, potassium, and cadmium in the calcine dissolve during the SZP process step. Consequently it is desirable that calcine containing higher or the highest concentration of magnesium, chloride, sodium, and potassium should be diverted for use in the SZP process plant, while calcine with lower concentrations of the aforesaid impurities be diverted to the neutral leaching step or other steps in the circuit. Since SZP solution will normally be discarded, either directly or indirectly, such a diversion of calcine will ensure maximum discard of the aforesaid impurities and prevent their accumulation in circuit solution: the steady state concentration of the aforesaid impurities in circuit solution will thereby be lowered. Depending under circumstances, the critical impurity may be either just one of the aforesaid impurities or alternatively more than one may need to be taken into consideration. In those cases where the critical impurity (or impurities) is derived from certain zinc sulphide concentrates, drosses or returns which are roasted in one or more fluid bed roasters to give calcine, it may be possible to maximise the concentraion of the impurity or impurities in the alcine used in the SZP plant by appropriate choice of the feed to the fluid bed roasters, both by diversion to one or more roasters and by roasting specific materials on a campaign basis. This is one feature of the present invention.

In many cases, however, the fluid bed roasters may not possess adequate flexibility in either the feeding systems or the calcine handling systems to allow particularly effective use of this concept. It will also be noted that manganese is not one of the impurities in calcine which dissolve during the SZP process step. Accordingly the applicants have investigated and discovered new improved procedures for using calcine in a SZP plant giving an acceptable water balance and lower steady state concentrations of impurity I, either alone or in conjunction with the above feature of maximising the concentration of impurity I, excepting manganese, in the calcine used in the SZP process plant.

For convenience, any zinc oxide containing compound, including calcine taken from any point on a fluid bed roaster roasting zinc sulphide concentrates, drosses, returns, and any other material will be subsequently termed R. A preferred form of R for the present invention is calcine from the bed of a fluid bed roaster, the said calcine preferably being ground before or within the SZP process step.

Since the word "calcine" is more meaningful it has been used subsequently in the text of the specification instead of R except where a broad embodiment of the invention is being defined.

The applicants have found that the increase in manganese precipitation at increasing pH using limestone as the precipitant leads to a marked loss in selectivity of precipitation at high pHs (as clearly disclosed in FIG. 3 on page 304 of the Papers presented at the Tasmania Conference, 1977 and published in May, 1977 by the Australasian Institute of Mining and Metallurgy) is at least partly due to the precipitation of manganese carbonate at high pHs. Thus if calcine is substituted for limestone the precipitation of manganese at high pHs is avoided. This is another feature of the present invention.

If, however, calcine fully replaces limestone, the water balance is adversely affected. A preferred embodiment of the present invention utilising this feature is to treat the feed solution to the SZP process plant with just sufficient limestone to reduce the dissolved zinc concentration to a concentration above 5 grams per liter, preferably about 10 grams per liter, separate off the resultant solids, and then treat the resultant SZP solution with calcine in a second stage to give a final SZP solution containing less than 10 grams of zinc per liter, preferably less than 5 grams per liter. Thus although the pH may rise to a high level during treatment with calcine to obtain a final SZP solution having a low zinc concentration, the extent of manganese precipitation will be nil or negligible compared to that using limestone to achieve the same zinc concentration in final SZP solution.

The separation of solids between the two stages as described above can be omitted if desired, but its omission may increase manganese precipitation in the second stage using calcine. The use of limestone in a first stage of the SZP process plant reduces the amount of zinc to be precipitated by calcine in the second stage, whilst the avoidance of manganese precipitation will minimise the amount of solution to be processed in the SZP process plant to control the steady state manganese concentration at an acceptable level. Both aspects minimise the amount of calcine to be used and consequently the adverse effects from its use on the water balance. The above preferred embodiment is termed herein step (a) for convenience. Step (a) also includes the use of separate SZP process plants as well as a single multi-stage SZP process plant. Step (a) also includes the use of other precipitants (lime for example) which contain some carbonates in the first stage of the SZP process plant.

For convenience the SZP solutions produced in stage i of a multi-stage SZP process plant will be termed Xi where, for example, the SZP solution from stage 1, X1, is treated in stage 2 to yield the SZP solution X2.

When either limestone or calcine is used as a precipitant of basic zinc sulphate, in a single or a multi-stage SZP process plant, the applicants have found that it is possible to displace a significant portion of the SZP solution accompanying the basic zinc sulphate and associated other solids (the mixture of basic zinc sulphate and associated other solids being hereinafter termed solids S) using a solution drawn from the circuit (which is this case may include fresh water), the latter solution being hereinafter termed solution B and generally will preferably contain in excess of 50 gram of zinc per liter. Consequently when the solids S are returned to the circuit, a much lower amount of SZP solution accompanying the solids S is simultaneously returned to the circuit as much of the solution accompanying the solids S has been drawn from the circuit, not the SZP process plant. Accordingly displacement of a significant portion of the SZP solution accompanying the solids S using solution B has a favourable effect upon the water balance in the circuit. The displacement of the SZP solution accompanying the solids S by solution B is a further feature of the present invention and is hereinafter termed step (b) for convenience.

The applicants have found that the SZP solution accompanying the solids S can be displaced irrespective of the choice of the solids-liquid separation system. Depending upon the solids-liquid separation system chosen, the displacement of the SZP solution accompanying the solids S may take place during or subsequent to solids-liquid separation. Where the displacement takes place within the solids-liquid separation system, some of the solution B may report with the SZP solution separated from the solids S and although this may not occur there will often be some risk that it will. If displacement is subsequent to the solids-liquid separation, there will be no risk of solution B contaminating at least that portion of the SZP solution previously separated from the solids S in the solids-liquid separation system.

The displaced SZP solution will normally be 5 to 100% by volume of the total SZP solution produced, depending upon the choice of the solids-liquid separation syste, the point where displacement of the SZP solution accompanying the solids S is effected, and the efficiency of displacement.

Where the displaced SZP solution is less than 30% of the total SZP solution produced and is contaminated by in excess of 10% of the solution B used for displacement, it is preferable to recycle the displaced SZP solution to the SZP process plant for further treatment. In many cases where the displaced SZP solution may be contaminated by some of the solution B used for displacement, the zinc concentration will not be sufficiently high to prevent use for washing solids or residues removed from the circuit: the said contaminated displaced SZP solution can be used for washing directly or after admixture with water, SZP solution drawn from the solids-liquid separation system, or other solutions drawn from (a) other stages of a multi-stage SZP process plant
(b) the circuit, or
(c) outside the circuit.

Alternatively, but less preferably, the displaced SZP solution may be discarded.

When filtration is the chosen solids-liquid separation system in excess of 20% of the SZP solution accompanying the solids S can normally be separated off as a filtrate at the filter cake forming stage. Tests on a vacuum drum filter have shown that at least two different methods are effective in displacing a high proportion of the SZP solution accompanying the solids S as solution entrained in the filter cake. The first method used one to four layers of felt strips positioned so that the end of each section just touched the filter cake moving underneath. The other end of each layer of felt was immersed in a vessel containing solution B. Solution B was accordingly drawn via capillary action up and then down the felt and was finally drawn by vacuum out of the felt and through the filter cake.

The other method successfully used consisted of an open-ended tube oscillating backwards and forwards across the face of the filter cake, the amount of solution B flowing through and out of the said tube being adjusted so that solution B flowed down the face of the filter cake in an amount sufficient to displace the required amount of SZP solution yet at the same time in an amount insufficient to permit solution B to enter the forming tank. Other alternative methods of spreading solution B, spraying for example, will be obvious to those skilled in the art.

It is important to disperse solution B evenly across the filter cake to avoid the filter cake drying out and cracking. The latter causes inefficient displacement and the by-passing of an unacceptable amount of solution B through the filter cake, the by-passed solution B then reporting with the displaced SZP solution. In the case of horizontal vacuum filers spraying, covering or flooding of the filter cake with solution B immediately after forming the filter cake will suppress cracking. In the case of vacuum leaf filters of the Moore type it may be necessary to suspend some solids in solution B to block cracks which are formed when the leaves are removed from the form vat and transferred into the vat containing solution B for subsequent displacement of the entrained SZP solution.

Where filtration is the chosen solids-liquid separation system it will generally be preferable for solution B to be hot as such a solution will be of lower viscosity and will therefore displace more rapidly the entrained SZP solution: solution B in such cases can be either preheated or chosen from a hot section of the circuit, or both.

When thickening is the chosen solids-liquid separation system, the applicants have found that it is possible to displace the SZP solution accompanying the solids S by a thickening decantation system using solution B. When such a procedure is used it will generally be preferable to use a counter-current decantation system with at least two and preferably three stages. It will also be generally preferable to ensure that solution B is hot, as it will then be of lower viccosity and the viscosities of mixed solutions originating from the two solutions entering the thickening counter-current decantation system, namely solution B and the SZP solution accompanying the solids S, will also be lower. For the same reason the pulp taken from the SZP process plant should preferably not be cooled ahead of the thickening counter-current decantation system. In fact, there may be sufficient advantage from an increase in the settling rate of the solids S to justify heating the pulp from the SZP process plant if the latter is operated at temperatures below 90° C. or even operating the SZP process plant itself at a temperature higher than that otherwise justifiable.

A preferred solids-liquid separation system incorporting displacement of the SZP solution accompanying the solids S all in one step is to transfer the solids by gravitational settling into solution B. This is yet another feature of the present invention.

In one simple form of equipment exemplifying this system, the solids S plus some or all of the SZP solution from the SZP process plant (i.e. some of the SZP solution from the SZP process plant may be separated off from the solids S by an earlier solids-liquid separation system if desired) are introduced into the upper zone 2 of a vertical cylindrical column 1 as indicated in the drawing. The specific gravity of the SZP solution introduced into the upper zone 2 generally will be lower than that of solution B introduced into the lower zone 4 of the drawing as the latter will generally have a significantly higher zinc concentration than the SZP solution. Accordingly there is no difficulty in maintaining an interface between the two solutions at an appropriate level in the column providing that pulps and solutions are introduced and withdrawn from the column at controlled and balanced rates and movement within the column arising from introduction or withodrawl of pulps or solutions is not excessive. Agitators or raking mechanisms which may be introduced within the column to facilitate movement of solids across the interface from zone 2 to 4 or from zone 3 to 4 or to facilitate withdrawal of solution B and solids S from the bottom of the column should be designed to avoid excessive disturbance within the column.

The settling rate of solids S in the upper zone 2 will generally be faster than in the lower zone 4 due to the lower specific gravity and viscosity of the SZP solution compared to solution B. This difference in settling rate is accentuated if the SZP solution temperature is higher than that of solution B. The difference is settling rate can lead to an accumulation zone 3 being present between zones 2 and 4, the interface between the SZP solution and solution B then lying towards or generally at the bottom of the accumulation zone 3. The formation of an accumulation zone is also accentuated in those cases where the rate of penetration of the solids through the interface is slower than their settling rate in either the SZP solution or solution B. The existence of an accumulation zone of limited height, up to 20cm for example, may be advantageous in forming flocs of higher specific density capable of penetrating the interface more easily and then settling more rapidly in the lower zone 4. The most direct method of controlling the height of the accumulation zone 3 is by varying the rate of feeding solids S, with accompanying SZP solution, to the column. The advantage obtainable from the use of flocculants, for example polyacrylamides, to form dense flocs of faster settling rate and increased capacity to penetrate the interface must be tested experimentally as the applicants cannot provide universally applicable advice in his regard. The effect of different flocculants, different flocculant addition rates, and operation of the column at a wide range of feed rates so that the column is operated under free settling conditions, that is, without an accumulation zone 3 as well as under hindered settling conditions with an accumulation zone 3 is recommended in order to establish the optimum conditions for the particular solids S and solutions to be handled in accordance with the process of the present invention.

The applicants have demonstrated that the solids S produced from using either limestone or calcine as the precipitant for basic zinc sulphate may be handled in a solids-liquid separation system of the above type. In reality the system is most advantageously applied to the solids produced when calcine is the precipitant for basic zinc sulphate as there is normally then a higher proportion of SZP solution associated with the resultant solids and therefore more is to be gained with respect to controlling the water balance and the concentration of impurity I in the circuit.

It will also be obvious to those skilled in the art that many forms of equipment other than the simple form exemplified in the drawing will be suitable for effecting the preferred solids-liquid separation system. It will also be obvious that many alternative features may be employed to improve the effectiveness of the preferred solids-liquid separation system, for example the use of a horizontal plate beneath the point of entry of the solids S and SZP solution to disperse them horizontally across the cross-sectional area of the colum.

When calcine is used as the precipitant of basic zinc sulphate, the aforesaid paper discloses that a bed calcine i.e. that obtained by overflow or withdrawal from the bed of a fluidbed roaster is a more effective zinc precipitant that the calcine of a similar particle size which reports in boilers, cyclones, and electrostatic precipitators as opposed to the bed. Grinding to increase the calcine surface area, thereby increasing the rate of precipitation is also disclosed.

Typically, less than 70% and often as little as 30% of the calcine produced from a fluid bed roaster comes from the bed. Consequently the amount of preferred calcine, i.e. calcine from the bed of a fluid bed roaster which is ground, may be inadequate to control satisfactorily the water balance or the concentration of impurity I in the circuit. This inadequacy will be accentuated if the calcine is inadequately ground.

The amount of SZP solution returned to the circuit can be significantly reduced by using step (b) of the present invention if the amount of SZP solution returned is the limiting constraint. This will in turn lessen the amount of solution to be processed in the SZP process plant and therefore the amount of calcine required. The use of step (b) thus increase the ability to accept an inadequately ground fluid bed calcine. The applicants have found that an average particle size up to 150 $\mu$m may be acceptable, but preferably the calcine should be 32 $\mu$m or less and that grinding to 32 $\mu$m or less is preferred for most applications to maximise the amount of zinc precipitated per tonne of ground bed calcine. In this specification the average particle size is defined as the size of an aperture through which 50 percent by weight will pass.

It will be evident that the company R may be either pre-ground or ground in-situ during the course of the reaction. In the latter case the size of compound R is defined as the average size at the time of the reaction. For practical purposes R as defined above can be measured by determining the average size of the solids S.

It has now been found that grinding not only increases the speed of the reaction but also increases the amount of zinc which can be precipitated by a given quantity of calcine before the reaction slows as equilibrium is reached. However, it has more surprisingly been found that the advantage in grinding calcine only holds down to a size of 5 $\mu$m and continued grinding to an average size of less than 5 $\mu$m does not provide any additional avantage with respect to the amount of zinc which can be precipitated by a given weight of calcine. An average particle size of approximately 10 $\mu$m appears optimum. Although sizes as low as 5 $\mu$m can, in fact, be used, such sizes will generally increase the grinding cost and the amount of SZP solution accompanying solids S returned to the circuit. As the calcine is ground increasigly fine the moisture content of solids S (when separated as a filter cake for example) increases, thus resulting in an increase in the amount of SZP solution accompanying given weight of solids S.

Accordingly a further feature of the invention is the use of a compound R containing zinc oxide having and average particle size of 5 to 150 $\mu$m. This feature is defined as step (c) of the present invention. Preferably, however, compound R is ground bed calcine having an average particle size in the range 7 to 32 $\mu$m more preferably with an average particle size of approximately 10 $\mu$m.

Further investigations have lead us to modifications in which the filter cake is compressed to increase the rejection of SZP solution Y accompaning the solids S.

In the immediately preceding discussion of calcine size, which was based on earlier experimental work, we stated that as the calcine is ground increasingly fine the moisture content of solids S increaes, and this factor imposes a constraint on the minimum size of 5 $\mu$m, below which there is no additional advantage with respect to the amount of zinc which can be precipitated by a given weight of calcine.

Subsequent investigations have shown that by compressing the filter cake to remoe SZP solution, the said constraint is obviated and operation with compound R ground to an average size of less 5 $\mu$m becomes possible.

Our subsequent investigations have shown that there may be some advantage in terms of the efficient utilisation of compound R for dissolved zinc precipitation when compound R is ground to less than 5$\mu$m. Although we do not wish to be limited by any postulated or hypothetical mechanism for the observed beneficial effects, we believe that under certain conditions the kinetics of zinc precipitation favour more complete utilisation of compound R and it also appears that the method of grinding compound R may have some importance.

Accordingly in a further feature of the invention the compound R may have an average particle size in the range 0.5 to 150 $\mu$m provided that the solids S are compressed before discharge in order to minimise the amount of entrained SZP solution Y which is returned to the circuit.

As has been discussed previously the availability of compound R in the preferred form of calcine from the bed of a fluid bed roaster may be limited. However, there are procedures for roasting zinc sulphide concentrate in which the entire calcined product ultimately reports in the bed of the fluid roaster. One such procedure is described in a paper by R. Denoiseux in Erzmetall Volume 33, No. 7/8, 1980, pages 366–371. In this procedure the zinc sulphide concentrate is mixed with fine calcine elutriated from the bed and then pelletised. The resultant pellets are then roasted in a fluid bed roaster.

Our further investigations have shown that the bed calcine produced by such a roasting procedure is, when ground, at least as effective for use in a SZP process plant as the bed calcine produced in a fluid bed roaster without pelletisation i.e. the bed calcine produced using procedures of the type described by R. Lightfoot (Papers presented at the Tasmania Conference, 1977, pages 359–365, published by the Australasian Institute of Mining and Metallurgy). Unless otherwise stated the use of bed calcine in this specification refers to material produced according to Lightfoot's description. Thus another feature of the invention is the use of a compound R which is preferentially formed by roasting zinc concentrate in a manner such that the amount of compound R which reports in the bed of the roater is increased, preferably such that the entire roasted product ultimately reports in the bed of the roaster.

According to the invention in a principal embodiment there is provided a process for controlling the water balance and the concentration of impurity I in an electrolytic zinc plant circuit in which zinc is selectively precipitated from an aqueous solution A containing zinc sulphate using a compound R containing zinc oxide as the precipitant thereby producing precipitated solids S containing basic zinc sulphate and a zinc deplected solution Y, the solids S being returned to the said circuit, and where the impurity I is a member of the group magnesium, manganese, chloride, sodium, and potassium, characterised by reducing the volume of zinc depleted solution Y returned daily to the said circuit in association with the solids S by a procedure incorporating at least one of the steps (a) to (c) as hereinafter defined, namely step (a) selectively precipitating as a basic zinc sulphate portion of the zinc present in solution A using a compound containing calcium carbonate as the precipitant to give a partially zinc depleted solution X1 containing at least 5 gram of zinc per liter preferably at least 10 gram of zinc per liter, but which requires subsequently less of the compound R containing zinc oxide to selectively precipitate sufficient of the remaining zinc, as a basic zinc sulphate, to achieve a final concentration of less than 10 gram of zinc per liter in solution X2, preferably less than 5 gram of zinc per liter.

step (b) taking 10 to 100 percent of the solids from a step in which zinc is selectively precipitated as a basic zinc sulphate into a solids separation system in which zinc depleted solution associated with the said solids is displaced by a solution B drawn from the said circuit and preferably containing in excess of 50 grams of zinc per liter, the solids separation system being drawn from the group
(i) filtration with washing of the filter cake by solution B.
(ii) thickening with counter-current decantation washing of the thickened solids by solution B, and
(iii) settlement of the said solids into solution B which flows through the lower section of a solids transfer column, and step (c) the use of a compound R which has an average particle size in the range 5 to 150 μm and which preferably has an average particle size in the range 7 to 32 μm.

According to one preferred embodiment of the invention there is provided a process in which step (b) is applied solely to the solids S arising from treatment of partially zinc depleted solution X1 containing at least 5 gram of zinc per liter by compound R containing zinc oxide to give a solution X2 containing less than 10 gram of zinc per liter: R is preferably ground bed calcine.

A more preferred embodiment is where step (b) is effected by taking 10 to 100 percent of the solids S arising from treatment of solution X1 by ground bed calcine and allowing settlement of said solids into solution B while the latter flows through the lower section of a solids transfer column, thereby achieving displacement of zinc depleted solution X2 by solution B.

Another preferred embodiment is where the compound R is preferentially formed from input materials to the said circuit which have the highest concentration of impurity I.

A further preferred embodiment of the present invention is to use the zinc depleted solution X2 produced according to the present invention for washing solids arising from the circuit, thereby producing a wash solution, for example a wash filtrate, with an increased zinc sulphate concentration and then introducing portion or all of the said wash solution into a SZP process plant, the said wash solution becoming solution A as previously defined. Such a flowsheet is shown schematically below and it will be seen that a closed washing circuit has been achieved. It will generally be desirable to return more than 10 percent of the said wash solution as solution A back to the SZP process plant. However, in some cases where the solids are washed in two stages on drum filters for example, it may be better to divert the first stage wash filtrate to the circuit and send only the second stage wash filtrate to the SZP process plant.

Flowsheet of a Preferred Embodiment in Which A Closed Washing Circuit is Used

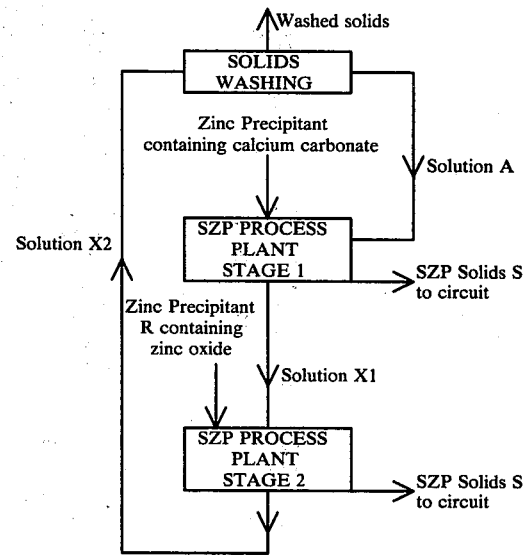

In another preferred embodiment of the invention solution B is used to wash the filter cake solids S in a multistage filtration. For instance in a two stage filtration the solution B is used to repulp the solids S from the first filtration stage and the filtrate from the second filtration stage is recycled for treatment by SZP becoming, for example, portion of solution A. The solids S containing solution Y from the second filtration stage are returned to the circuit.

Another preferred embodiment of the present invention is to compress the solids S before discharge, thus maximising the rejection of SZP solution from the filter cake and minimising the amount of SZP solution Y returned to the circuit with the solids S. A convenient method of forming a compressed cake is to separate the solids by pressure filtration and then to squeeze the formed cake with an expandable diaphragm before discharge. In this embodiment the displacement washing of the solids S by solution B may be optionally implemented either before or after the cake is squeezed, to give additional rejection of the SZP solution from the cake comprising solids S and methods such as attrition milling may be beneficially employed to grind the compound R very finely.

Another preferred embodiment of the present invention is to form the compound R by roasting zinc concentrate in a manner such that the amount of compound R which reports in the bed of the roaster is increased, preferably such that the entire roasted product ultimately reports in the bed of the roaster. Where two different roasting procedures are employed to supply compound R in the form of calcined zinc concentrate from the roaster bed it will normally be advantageous to treat preferentially those zinc sulphide concentrate materials which have the highest content of impurity I in the roasting plant which yields the greatest proportion of its product R as calcine from the bed of the roaster.

The applicants wish to emphasize that there are many ways of integrating the various features or steps of the process of the present invention with a circuit which possesses at least one SZP process plant, the latter containing one or more stages. Thus, for example, solution A treated in accordance with the present invention may be drawn from various points in the circuit and in varying proportions: water or other solutions can be incorporated into solution A or subsequently added during or at the end of one or more stages of the SZP process plant. Solution A may contain 0 to 100% of the wash solution produced from washing solids, the latter term including precipitates, cements, cementates, or residues produced or withdrawn from the circuit. Solids can, for example, be washed with water, zinc depleted solution produced from a stage of a SZP process plant, or other solutions drawn from the circuit or elsewhere, either singly or as mixtures. All the above merely exemplify a few of the many ways of using the process of the present invention and integrating it with the circuit and each of the many ways is included within the scope of the present invention. In no instance do changes in the points where solutions are taken from or returned to the circuit or the SZP process plant or plants nor changes in the places where solids are taken from or returned to the circuit or the SZP process plant or plants remove one from the scope of the present invention.

The process of the present invention is illustrated by the following non-limiting Examples.

EXAMPLE 1

A sample of bed calcine from a fluid bed roaster, containing 60% Zn, was ground in water until 94% passed through a 38 $\mu$m screen. The average particle size was 10 $\mu$m. The ground calcine pulp was fed continuously to the first reactor in a train of three. In Run A a solution containing 24.0 g Zn/l was fed continuously to the first reactor and in Run B a solution containing 11.6 g Zn/l. The operating temperatures in each reactor were controlled at 50°±1° C. throughout each run. When steady state had been achieved, samples of pulp were taken from each reactor, filtered, and the filtrate assayed for zinc. The results are set out in Table 2 below and show that more than 85% of the dissolved zinc input in solution was precipitated as basic zinc sulphate.

TABLE 2

| Run | Zn (g/l) in combined solution to first reactor | Grams calcine added/gram of dissolved Zn in input solution | Average Zn (g/l) in filtrate ex reactor | | |
|---|---|---|---|---|---|
| | | | 1 | 2 | 3 |
| A | 20.9 | 11.7 | 6.0 | 3.0 | 2.2 |
| B | 10.1 | 23.8 | 1.7 | 0.59 | 0.34 |

The filter cake from filtering pulp from the third reactor was washed and then analysed for various elements. Based upon the analyses of input calcine and washed solids, the amount of various ions dissolving from calcine during basic zinc sulphate precipitation was calculated and are shown in Table 3.

TABLE 3

| Ion | Percent in Calcine | Percent in washed filter cake for Run | | Percentage dissolution of ions during basic zinc sulphate precipitation during run | |
|---|---|---|---|---|---|
| | | A | B | A | B |
| Mg | 0.14 | 0.06 | 0.07 | 41.7 | 41.3 |
| Mn | 0.60 | 0.46 | 0.53 | −7.9 | 2.2 |
| Cd | 0.16 | 0.045 | 0.08 | 45.9 | 37.2 |
| Na | 0.13 | 0.006 | 0.002 | 51.3 | 67.6 |
| K | 0.14 | 0.03 | 0.04 | 44.3 | 39.2 |
| Cl | 0.005 | 0.002 | 0.004 | 67.2 | 82.4 |
| F | 0.002 | 0.001 | 0.002 | 40.5 | 1.8 |

It will be seen that there was significant dissolution of magnesium, cadmium, sodium, potassium, and chlorine, but not manganese from ground calcine. The negative dissolution in Run A indicates that some manganese was precipitated from solution.

EXAMPLE 2

Solutions containing various concentrations of zinc, manganese, and magnesium were treated batchwise with either calcium carbonate, zinc oxide, ground bed calcine with an average particle size of approximately 30 $\mu$m, or sodium carbonate. The test conditions and results are set out in Table 4 below.

TABLE 4

| Experiment | Precipitant of basic zinc sulphate | Temp (°C.) | Time (Min) | pH measured at 20° C. | Concentration (g/l) of | | |
|---|---|---|---|---|---|---|---|
| | | | | | Zn | Mn | Mg |
| 1 | Analytical grade calcium carbonate | 90 | 0 | 5.13 | 84.4 | 15.4 | 2.4 |
| | | | 20 | 5.85 | 61.6 | 14.8 | 2.4 |
| | | | 60 | 6.08 | 21.6 | 13.2 | 2.8 |
| | | | 75 | 6.29 | 6.75 | 12.9 | — |
| | | | 90 | 6.85 | 1.3 | 6.4 | 2.6 |
| | | | 150 | 6.96 | 1.1 | 5.0 | 2.8 |
| 2 | Analytical grade calcium carbonate | 50 | 0 | — | 84.4 | 15.2 | 2.4 |
| | | | 30 | 6.08 | 20.4 | 12.0 | 2.6 |
| | | | 60 | 6.36 | 14.1 | 10.5 | 2.6 |
| | | | 120 | 6.70 | 8.8 | 8.8 | 2.6 |
| | | | 240 | 7.05 | 6.8 | 8.55 | 2.5 |
| 8 | Analytical grade calcium carbonate with aeration i.e. sparging with air | 90 | 0 | 5.44 | 82.8 | 15.6 | — |
| | | | 30 | 6.00 | 48.5 | 15.7 | — |
| | | | 60 | 6.19 | 32.5 | 14.8 | — |
| | | | 90 | 6.59 | 8.6 | 14.0 | — |
| | | | 120 | 7.45 | 0.34 | 5.0 | — |
| 9 | Analytical grade calcium carbonate sparging with nitrogen | 90 | 0 | — | 80.0 | 13.0 | — |
| | | | 30 | 6.01 | 46.2 | 14.4 | — |
| | | | 60 | 6.44 | 9.8 | 12.5 | — |
| | | | 90 | 7.26 | 0.61 | 4.0 | — |
| | | | 120 | 7.45 | 0.33 | 2.6 | — |
| 3 | Zinc oxide | 90 | 0 | 5.12 | 87.3 | 16.2 | 2.6 |
| | | | 5 | 6.29 | 12.4 | 18.4 | 3.0 |
| | | | 10 | 6.40 | 7.5 | 17.1 | 3.0 |
| | | | 20 | 6.55 | 4.8 | 18.6 | 3.0 |
| | | | 45 | 6.74 | 2.2 | 16.8 | 3.0 |
| | | | 90 | 6.82 | 2.1 | 18.3 | 3.2 |
| 4 | Zinc oxide | 50 | 0 | 5.79 | 84.4 | 15.3 | 2.5 |
| | | | 30 | 6.32 | 8.5 | 16.0 | 2.9 |
| | | | 60 | 6.52 | 4.4 | 16.4 | 2.8 |
| | | | 120 | 6.80 | 1.8 | 15.0 | 2.7 |
| | | | 300 | 7.01 | 0.96 | 14.8 | 2.7 |
| 5 | Calcine | 90 | 0 | 5.33 | 57.6 | 10.2 | 1.6 |
| | | | 15 | 5.94 | 24.0 | 9.9 | 1.8 |
| | | | 60 | 6.09 | 16.0 | 10.0 | 1.7 |

TABLE 4-continued

| Experiment | Precipitant of basic zinc sulphate | Temp (°C.) | Time (Min) | pH measured at 20° C. | Concentration (g/l) of Zn | Mn | Mg |
|---|---|---|---|---|---|---|---|
| | | | 120 | 6.16 | 14.4 | 11.1 | 1.8 |
| | | | 300 | 6.35 | 5.9 | 9.9 | 1.7 |
| 6 | Calcine | 50 | 0 | 5.50 | 53.7 | 9.6 | 1.5 |
| | | | 30 | 6.15 | 17.0 | 10.0 | 1 7 |
| | | | 120 | 6.25 | 4.4 | 10.4 | 1.7 |
| | | | 360 | 6.54 | 0.9 | 10.0 | 1.6 |
| | | | 420 | 6.62 | 0.9 | 11.5 | 1.8 |
| 7 | Sodium Carbonate | 90 | 0 | 4.16 | 20.4 | 20.8 | — |
| | | | 30 | 6.46 | 8.9 | 17.0 | — |
| | | | 60 | 6.64 | 6.9 | 13.2 | — |
| | | | 90 | 6.79 | 2.6 | 13.0 | — |

The results of Table 4 show that significant manganese precipitation occurs at high pHs, equivalent to low zinc concentrations, when calcium carbonate is used as the precipitant of basic zinc sulphate. When zinc oxide or calcine is used as the precipitant, manganese precipitation is insignificant even when terminal zinc concentrations of the order of 1 g/l are attained. The precipitate obtained using sodium carbonate was examined by X-ray diffraction and the presence of $MnCO_3$ established (A.S.T.M. powder diffraction number 7/268). The same peaks were also identified in the precipitates from a commercial SZP process plant in which limestone was used. The applicants therefore believe that at least over the range of pHs examined in the above experiments precipitation of manganese carbonate is at least partially responsible for the precipitation of manganese when carbonates such as limestone are used to precipitate basic zinc sulphate.

More importantly, however, the above results demonstrate that when limestone is used manganese precipitation becomes significant only when the zinc concentration is less than approximately 20 grams of Zn per liter. When the pulp is sparged with air or nitrogen, the zinc concentration may be reduced to approximately 10 grams per liter before manganese precipitation starts to become significant. Sparging would lower the concentration of carbon dioxide in the pulp and this presumably prevents manganese carbonate precipitation until lower zinc concentrations are attained.

If the control of manganese is important, but not critical, it may be possible to tolerate a minor loss of selectivity with respect to manganese. It may for instance be acceptable to use calcium carbonate to decrease the zinc concentration to say 5 g/l followed by the use of calcine to achieve a lower zinc concentration, say 1 g/l. From the results of experiment 1 it is apparent that calcium carbonate can be used to precipitate 92% of the zinc while simultaneously precipitating only 16% of the manganese, the terminal zinc concentration being 6.75 g/l.

EXAMPLE 3

A. Displacement washing on a tilting pan filter

The solids S formed when zinc was precipitated as basic zinc sulphate from a zinc sulphate solution by an excess of either limestone or ground bed calcine were filtered on a 0.05 $m^2$ tilting pan filter. As soon as the filter cake surface was dewatered the cake was subjected to displacement washing using a high zinc sulphate tenor solution. The filtration data are presented in Table 5 and the results for the displacement washing are given in Tables 6 and 7 respectively for the use of limestone and calcine as the zinc precipitant.

TABLE 5

Filtration data for the separation of solids S

| Variable | ZINC PRECIPITANT Limestone | Calcine |
|---|---|---|
| Pulp filtraton | | |
| Pulp temperature | 90° C. | 90° C. |
| Primary filtration rate | 0.94 $m^3$ of filtrate/($m^2$h) | 1.22 $m^3$ of filtrate/($m^2$h) |
| Cake thickness | 24 mm | 22 mm |
| Zinc in primary filtrate | 1.6 g/l | 0.74 g/l |
| Volume of displaceable SZP solution in filter cake | 1160 ml | 1005 ml |
| Volume of SZP solution as primary filtrate | 1545 ml | 255 ml |
| Cake washing | | |
| Solution used to wash cake } Temp. zinc conc. | 90° C. 95 g/l | 90° C. 120 g/l |
| Wash filtration rate | 0.20 $m^3$ of filtrate/($m^2$h) | 0.27 $m^3$ of filtrate/($m^2$h) |

TABLE 6

Results for the displacement of SZP solution from a filter cake of solids S generated using limestone and washing with a solution containing 95 g zinc/l

| Total volume of wash filtrate (ml) | Zinc concentration in incremental volume of wash filtrate (g/l) | Average zinc concentration in total volume of wash filtrate (g/l) | Ratio of wash filtrate volume/displaceable SZP solution volume | Volume of displaced SZP solution reporting in wash filtrate (l) | Fraction of total SZP solution volume reporting in primary plus wash filtrate | Zinc concentration in the total volume of primary plus wash filtrate |
|---|---|---|---|---|---|---|
| 0 | 0 | 0 | 0 | 0 | 0.57 | 1.6 |
| 310 | 1.6 | 1.6 | 0.27 | 0.31 | 0.69 | 1.6 |
| 530 | 2.5 | 2.0 | 0.46 | 0.53 | 0.77 | 1.7 |
| 692 | 3.4 | 2.3 | 0.60 | 0.69 | 0.83 | 1.8 |
| 882 | 4.8 | 2.8 | 0.76 | 0.87 | 0.89 | 2.0 |
| 967 | 11.0 | 3.6 | 0.83 | 0.95 | 0.92 | 2.4 |
| 1087 | 16.8 | 5.0 | 0.94 | 1.05 | 0.96 | 3.0 |
| 1263 | 52.3 | 11.3 | 1.09 | 1.13 | 0.99 | 6.0 |
| 1338 | 78.6 | 15.0 | 1.15 | 1.15 | 0.99 | 7.8 |
| 1436 | 86.4 | 19.9 | 1.24 | 1.16 | 1.00 | 10.4 |

TABLE 6-continued

Results for the displacement of SZP solution from a filter cake of solids S
generated using limestone and washing with a solution containing 95 g zinc/l

| Total volume of wash filtrate (ml) | Zinc concentration in incremental volume of wash filtrate (g/l) | Average zinc concentration in total volume of wash filtrate (g/l) | Ratio of wash filtrate volume/ displaceable SZP solution volume | Volume of displaced SZP solution reporting in wash filtrate (l) | Fraction of total SZP solution volume reporting in primary plus wash filtrate | Zinc concentration in the total volume of primary plus wash filtrate |
|---|---|---|---|---|---|---|
| 1571 | 90.8 | 26.0 | 1.35 | 1.16 | 1.00 | 13.9 |

From Table 6 it is apparent that only 57% of the SZP solution reported as primary filtrate and hence 43 percent of the SZP solution would be returned to the circuit in the solids S in absence of displacement washing of the cake. However if the cake is washed with sufficient high 95 g/l zinc tenor solution to form a volume of wash filtrate equal to 83 percent of the volume of displaceable SZP solution in the filter cake, the combined primary and wash filtrates contain 92 percent of the total SZP solution. Hence only 8 percent of the SZP solution is returned to the circuit with the solids S in the washed filter cake. During the displacement washing procedure some high zinc tenor solution used to wash the cake, contaminates the wash filtrate and the zinc concentration in the combined primary and wash filtrates is 2.4 g/l compared with 1.6 g/l in primary wash filtrate. However, the increase in zinc concentration is probably insufficient to render the combined primary and wash filtrates unsuitable for either use to wash solids arising from the circuit, or for discard. In the event that the wash filtrate contains unacceptably high zinc concentrations either a portion or all of the wash filtrate should be recycled and used to dilute solution A which is input to the SZP process plant.

From Table 7 it is apparent that only 20 percent of the SZP solution reported as primary filtrate, and hence 80 percent of the SZP solution would be returned to the circuit in the absence of displacement washing of the cake. However if the cake is washed with sufficient high 120 g/l zinc tenor solution to form a volume of wash filtrate equal to 85 percent of the volume of displaceable SZP solution in the filter cake, the combined primary and wash filtrates contain 85 percent of the total SZP solution. Hence only 15 percent of the SZP solution is returned to the circuit with the solids S in the washed filter cake. However, during the displacement washing procedure sufficient high zinc tenor solution used to wash the cake, contaminates the wash filtrate to increase the zinc tenor of the combined primary and wash filtrates to 4.0 g/l.

TABLE 7

Results for the displacement of SZP solution from a filter cake of solids S
generated using calcine and washing with a solution containing 120 g zinc/l

| Total volume of wash filtrate (ml) | Zinc concentration in incremental volume of wash filtrate (g/l) | Average zinc concentration in total volume of wash filtrate (g/l) | Ratio of wash filtrate volume/ displaceable SZP solution volume | Volume of displaced SZP solution reporting in wash filtrate (l) | Fraction of total SZP solution volume reporting in primary plus wash filtrate | Zinc concentration in the total volume of primary plus wash filtrate |
|---|---|---|---|---|---|---|
| 0 | 0 | 0 | 0 | 0 | 0.20 | 0.74 |
| 260 | 8.6 | 8.6 | 0.26 | 0.24 | 0.40 | 4.7 |
| 544 | 2.6 | 5.5 | 0.54 | 0.52 | 0.62 | 4.0 |
| 689 | 1.4 | 4.6 | 0.69 | 0.67 | 0.73 | 3.6 |
| 851 | 6.6 | 5.0 | 0.85 | 0.82 | 0.85 | 4.0 |
| 992 | 31.7 | 8.8 | 0.99 | 0.93 | 0.94 | 7.2 |
| 1131 | 81.4 | 17.7 | 1.13 | 0.97 | 0.97 | 14.6 |
| 1254 | 103.2 | 26.1 | 1.25 | 0.99 | 0.99 | 21.8 |
| 1388 | 112.6 | 33.4 | 1.38 | 1.01 | 1.00 | 28.3 |
| 1502 | 116.3 | 40.7 | 1.49 | 1.00 | 1.00 | 34.9 |
| 1647 | 117.5 | 47.4 | 1.64 | 1.00 | 1.00 | 41.4 |

A concentration of 4.0 g/l zinc may be considered to be sufficiently low for the combined filtrates to be used to wash solids arising from the circuit in a closed washing operation. Alternatively either a portion or all of the wash filtrate maybe recycled to the basic zinc sulphate precipitation step to dilute the solution A treated in the SZP process plant. For such an operation with wash filtrate recycle the volume of primary filtrate, which has a lower zinc tenor of 0.74 g/l compared with 4.0 g/l in combined filtrates, will be increased by an amount approximately equal to the volume of wash filtrate which is recycled.

From Table 7 it is apparent that, in general, the percent of displaceable SZP solution washed from the cake increases as the volume of high zinc tenor solution used to wash the cake increases. However, as the percent of displaceable SZP solution washed from the cake approaches 100 increasingly large volumes of solution used to wash the cake, contaminate the wash filtrate increasing its zinc tenor to concentrations which will preclude its use for washing solids arising from the circuit and necessitating its recycle to the SZP process plant.

Table 7 shows that a small amount of high zinc tenor solution used to wash the cake breaks through at the commencement of displacement washing. It is suggested that such break through is a consequence of solution used to wash the cake short circuiting the cake by passing through cracks, which are subsequently plugged when solution used to wash the cake flushes cake solids ihto the cracks. When such solution break through occurs it may be beneficial to suspend some cake solids in the high zinc tenor solution.

B. Displacement washing on a belt discharge drum filter.

Solids S generated by the use of calcine as a zinc precipitant for SZP were separated from SZP solution using a 0.2 m² drum filter. The formed filter cake was washed with zinc sulphate solution B containing 120 g Zn/l using felt strips to distribute the wash solution over the surface of the cake. The cake wash rate was equivalent to 48 percent of the displaceable SZP solution entrained in the unwashed cake. The results of a pair of duplicate experiments confirm that the wash filtrate for practical purposes was not contaminated with the high zinc tenor solution B used to wash the cake.

TABLE 8

| | Drum Filter Results | | | |
|---|---|---|---|---|
| | Zinc (g/l) in | | Cake moisture (%) at 105° C. in | |
| Experiment | Form filtrate* | Wash filtrate** | Formed Cake | Washed cake |
| 1 | 1.6 | 1.3 | 36.2% | 34.2% |
| 2 | 2.3 | 2.3 | 34.7% | 33.2% |

*Form filtrate—filtrate formed during cake formation
**Wash filtrate—filtrate formed during cake washing The fact that the wash filtrate zinc tenor in experiment 1 was lower than the concentration in form filtrate suggests that additional zinc precipitation occurred by reaction between SZP solution (and solution B) and excess calcine during the washing procedure.

EXAMPLE 4

Solids Transfer column - small scale demonstration

The principles underlying the operation of the solids transfer column are exemplified by a series of experiments conducted in 500 ml graduated measuring cylinders. In the tests 200 ml of manganese free SZP solution (1 g Zn/l) was carefully floated as an upper zone on a lower zone comprising 250 ml of manganese free high zinc tenor solution (120 g Zn/l). 50 ml of pulp containing the solids S generated either by using limestone or calcine as the precipitant for SZP was then slowly added to the SZP solution in the upper zone of the measuring cylinder. The input pulp had been previously doped with 1 g Mn/l at which concentration no manganese is precipitated by reaction with either type of suspended solids S. The subsequent distribution of manganese between the low and high zinc tenor zones was determined analytically and used as a means of quantifying the amount of SZP solution carried down with the solids into the high zinc tenor zone as the solids settled into it, by descending through the interface between the SZP and high zinc tenor solution zones.

For tests with limestone-BZS solids (236 g of dry solids/l) only 2 to 4% of the input manganese, and hence SZP solution, was transferred with the settled solids into the high zinc tenor zone. Flocculation of the solids (using a proprietary flocculant) neither significantly increased the rate of solids transfer through the interface between the SZP and high zinc tenor solutions, nor the degree of SZP solution transfer with the solids. Gentle agitation of the interface between the SZP and high zinc tenor solutions did not affect the amount of SZP solution transferred through the interface, but the rate of solids transfer decreased significantly with agitation.

For similar tests with calcine-BZS solids (790 g of dry solids/l) approximately 15% of input manganese reported in the high zinc tenor zone irrespective of the experimental conditions. The rate of solids transfer through the interface however increased dramatically when the solids were flocculated using a proprietary flocculant (settling time 8 mins for flocculated pulp compared with 45 mins without flocculation).

The transfer rates of SZP solution into the high zinc tenor were 0.08 to 0.16 ml per gram of limestone-BZS solids and approximately 0.14 ml per gram of calcine-BZS solids.

Solids Transfer column - pilot scale demonstration

A 100 liter scale solids transfer column has been successfully used to effect solids-liquid separation for suspensions of the solids S generated either by using limestone or calcine as the precipitator for SZP. In the experiment in which the precipitant was calcine it was necessary to dilute the suspended solids concentration with water prior to addition to the column in order to obtain an adequate rate of solids movement through the interface between the SZP and high zinc tenor solution zones. Recycled SZP solution may be used as the diluent in applications where constraints imposed by the electrolytic zinc plant circuit water balance preclude the use of water for dilution. The solids were also flocculated with 5 ppm w/w of proprietary flocculant. The solids S concentration in the suspension input to the column was 300 g of dry solids/l for the use of limestone and 220 g/l for the use of calcine as the zinc precipitant. Throughout both experiments the clarity of the resultant displaced SZP solution was excellent, with less than 0.1 g/l of solids remaining in suspension.

Typical results obtained during the 4 hour experiments are given in Table 9.

TABLE 9

| | Typical Results for Pilot Solids Transfer Column Operation | | | |
|---|---|---|---|---|
| | INPUT TO COLUMN | | OUTPUT FROM COLUMN | |
| Stream | SZP solution input to upper section of column | High zinc tenor solution input to lower section of column | Resultant clarified SZP solution output from upper section of column | High zinc tenor solution output from lower section of column |
| Calcine-BZS solids suspension | | | | |
| Solution flowrate (ml/min) | 570 | 450 | 540 | 480 |
| Dissolved zinc concentration (g/l) | 2.3 | 108.0 | 7.3 | 95.5 |
| Limestone-BZS solids suspension | | | | |
| Solution flowrate (ml/min) | 430 | 460 | 450 | 440 |
| Dissolved zinc concentration | 1.1 | 115.5 | 1.5 | 90.4 |

TABLE 9-continued

Typical Results for Pilot Solids Transfer Column Operation

| Stream (g/l) | INPUT TO COLUMN | | OUTPUT FROM COLUMN | |
|---|---|---|---|---|
| | SZP solution input to upper section of column | High zinc tenor solution input to lower section of column | Resultant clarified SZP solution output from upper section of column | High zinc tenor solution output from lower section of column |

In the case of the transfer of solids S generated using limestone the Table 9 results may for practical purposes be interpreted as corresponding to the complete transfer of solids S from the SZP solution with the simultaneous contamination of the displaced SZP solution with 0.4% of the zinc contained in the high zinc tenor solution B into which the solids were transferred. From the overall mass balance for dissolved zinc it appears that 24% of the zinc contained in the high zinc tenor solution was precipitated by reaction with unconsumed limestone contained in the solids S.

EXAMPLE 5

A screen with a 6 mm aperture was used to remove coarse particles from calcine drawn from the bed of a fluid bed roaster treating zinc concentrate. Bed calcine passing through the screen was ground in water for various lengths of time to produce a series of calcine samples ranging in average particle size from 130 $\mu$m at zero grinding time to 2.3 $\mu$m for a grinding time of 1440 minutes.

The bed calcine samples were used to treat a synthetic zinc plant solution containing approximately 40 g of dissolved zinc/liter. Solutions of this type are produced when zinc plant residues or precipitate filter cakes are washed. Bed calcine samples were average particle sizes ranging from 5 to 130 $\mu$m were used to treat the synthetic zinc plant liquor at a rate of 420 g of bed calcine/liter of solution. The experiments were conducted at 90° C. in 3 liter beakers, agitated at 500 rpm using a 5 cm diameter turbine impeller (600 rpm was necessary to fluidise the pulp formed with 5.0 $\mu$m average size bed calcine). After 3 hours the pulp was filtered on a Buchner funnel and the filter cake moisture was determined by measuring the loss in weight when the cake was dried at 110° C. in an oven. Bed calcine samples with average size of less than 5.0 $\mu$m were used to treat synthetic zinc plant liquor containing approximately 20 g/l of zinc because it was not possible to fluidise the reacted pulp under the conditions used for bed calcine samples with average particle size equal to or greater than 5.0 $\mu$m For bed calcine samples of less than 5.0 $\mu$m average particle size the rate of bed calcine addition to synthetic zinc plant liquor was 210 g/liter.

Table 10 contains the results for the above series of experiments. It is apparent that decreasing the average particle size from 130 to 5.0 $\mu$m results in an increase in the effectiveness of zinc precipitation, the weight of bed calcine required to precipitate 1g of dissolved zinc decreasing from 24.4 to 10.0 g. However, grinding the bed calcine to an average particle size of less than 5.0 $\mu$m does not result in any additional increase in the effectiveness of zinc precipitation. Table 10 also shows that as the bed calcine is ground more finely the moisture content of the filter cake increases, for instance from 19.0 to 65.5 percent, for bed calcine with average particle sizes of 130 and 4.0 $\mu$m, respectively. When the volume of zinc depleted liquor Y contained in the filter cake is compared, on the basis of the precipitation of 1g of dissolved zinc, it is apparent that there is little disadvantage with respect to Y in grinding bed calcine unless the average particle size is less than about 9.4 $\mu$m Examination of Table 10 indicates that although the cake moisture content increases as the average particle size decreases, there is a simultaneous decrease in the amount of bed calcine required to precipitate a unit weight of dissolved zinc, and hence the mass of the filter cake is decreased. Thus the decreased bed calcine requirement almost exactly compensates for the increased cake moisture content. However, when the average calcine particle size is less than 9.4 $\mu$m, the cake moisture content increases more rapidly with decreasing average particle size than does the corresponding decrease in the bed calcine requirement for zinc precipitation. Hence there is an increase in the volume of zinc depleted liquor Y contained in the filter cake.

In designing SZP process plants for electrolytic zinc plant applications the availability of bed calcine is often limited.

The calcine used in the present tests contained 61.5 percent zinc of which 55 percent was soluble in weak acid and would be expected to dissolve in most electrolytic zinc plant circuits. The zinc content of the calcine and the solubility of its zinc content in weak acid are typical of calcines treated throughout the electrolytic zinc industry. Furthermore the zinc content and its dissolution in weak acid are usually similar, within one or two percent, for the total calcine product and the bed calcine produced in fluid bed roasters. In those electrolytic zinc plants incorporating a residue treatment section overall zinc dissolution will be greater than 55 percent.

TABLE 10

Results for the treatment of 1 liter of synthetic zinc plant liquor with bed calcine.

| Average particle size $\mu$m | Zinc Concentration | | Filter Cake Moisture Content percent | Volume of H$_2$O in filter cake Y | Weight of bed calcine required |
|---|---|---|---|---|---|
| | Initial g/l | Final Filtrate g/l | | For the precipitation of 1g of dissolved zinc | |
| | | | | ml | g |
| 130 | 38.5 | 21.3 | 19.0 | 5.4 | 24.4 |
| 56 | 39.5 | 18.6 | 25.7 | 7.0 | 20.1 |
| 32 | 39.7 | 16.1 | 26.3 | 6.4 | 17.8 |
| 9.4 | 40.8 | 8.2 | 32.8 | 7.3 | 12.9 |
| 7.4 | 41.2 | 4.0 | 41.8 | 9.4 | 11.3 |
| 5.0 | 43.0 | 1.0 | 53.9 | 14.5 | 10.0 |
| 4.0 | 21.5 | 1.1 | 65.5 | 24.7 | 10.3 |
| 2.7 | 21.5 | 0.7 | 66.6 | 25.6 | 10.1 |
| 2.3 | 21.5 | 0.6 | 64.2 | 23.9 | 10.0 |

In order to exemplify the consequences of limited bed calcine availability consider an application in which 1000 tonnes of total calcine equivalent to the bed calcine used in the present tests is tested in an electrolytic zinc plant (i.e. 550 tones of zinc would be dissolved). If 40 percent of the total calcine reports as bed calcine then (1000×0.4)/24.4=16.4 tonnes or 3.0 percent of the zinc dissolved in the electrolytic zinc plant circuit can be precipitated using bed calcine with an average particle size of 130 $\mu$m. However, as disclosed in a paper printed in Metallurgical Transactions B published by the American Society for Metals and the Metallurgical Society for AIME, Volume 11B, March 1980, pages 73-82, it is necessary in many SZP applications to precipitate at least 5 percent of the zinc which is dissolved in the electrolytic zinc plant circuit. Hence, many applications would be precluded if bed calcine availability was limited to 40 percent of the total calcine and the average size of the bed calcine as 130 $\mu$m. However, if the bed calcine was ground its use would be viable for additional applications. For instance in the present case grinding the bed calcine to an average particle size of 9.4 $\mu$m will allow $(1000 \times 0.4)/12.9 = 31$ tonnes or 5.6 percent of the dissolved zinc in the electrolytic zinc circuit to be precipitated. Thus grinding of bed calcine to sizes in the range 7.4 to 32 $\mu$m will be an important feature of many SZP applications. Clearly as there is a cost penalty associated with impurity control and finer grinding of bed calcine as well as water balance penalties associated with an increase in the volume of zinc depleted liquor Y returned to the electrolytic zinc plant circuit with the SZP process plant filter cake, it is necessary to optimise the size to which calcine is ground with respect to the constraints imposed by each individual application. The principles by which data contained in Table 10 may be used to determine the optimum calcine particle size for a given application will be obvious to one skilled in the art.

The procedure used to grind bed calcine used in the present test may be described as open circuit. If the bed calcine had been ground in a closed circuit, for instance by separating oversized material with a hydrocyclone and returning it to a ball mill, the range of particle sizes about the average particle size would have decreased. The results in Table 10 suggest that for bed calcine ground to an average size of 7.4 $\mu$m, the overground fraction of the sample, comprising particles of $\leq 5$ $\mu$m will not increase the amount of zinc precipitated, but will have an adverse effect on the cake moisture content. Thus by using a closed circuit grinding method to achieve an average particle size of 7 $\mu$m the fraction of particles sized $\leq 5$ $\mu$m will be decreased; this will decrease the moisture content of the cake but will not significantly decrease the amount of dissolved zinc which can be precipitated by a unit quantity of bed calcine ground to an average particle size of 7 $\mu$m. Thus where the availability of bed calcine is limiting there will be advantages in closed circuit grinding.

EXAMPLE 6

Use of decantation for displacement of zinc depleted liquor 500 mls of reacted pulp formed by the use of bed calcine with an average particle size of 7.4 $\mu$m prepared as described in Example 5 was mixed with 500 ml of water, gently agitated for 60 seconds, and then allowed to settle for approximately four hours. 375 mls of clear supernatant solution were decanted from the settled pulp. 375 mls of water were added to the settled solids which were resuspended by agitation for 60 seconds and then allowed to settle for a further 4 hours. 390 mls of clear supernatant solution were then decanted from the resettled solids. This procedure was repeated a further three times, with addition of sufficient water on each occasion to maintain a constant pulp volume of 1.0 liter prior to resettlement.

The results are shown in Table 11. The volume of zinc depleted solution entrained in 500 mls of reacted pulp before decantation was determined experimentally to be 407 mls by filtering the pulp and then drying the filter cake; the volume of entrained solution being the sum of the filtrate volume and the volume of water which was volatilised on drying.

TABLE 11

| | | | Results for decantation experiment | | | | |
|---|---|---|---|---|---|---|---|
| | | | Magnesium | | | Manganese | |
| Solution | | Volume ml | Concentration g/l | Weight contained in soln. g | Cumulative efficiency of displacement percent | Concentration g/l | Weight contained in soln. g | Cumulative efficiency of displacement percent |
| Zinc depleted solution entrained in reacted pulp before tests | | 407 | 7.1 | 2.89 | | 11.7 | 4.76 | |
| | Decantation number | | | | | | | |
| Supernatant solution | 1 | 375 | 3.2 | 1.13 | 39 | 5.4 | 2.03 | 43 |
| | 2 | 390 | 1.8 | 0.70 | 63 | 3.1 | 1.21 | 68 |
| | 3 | 400 | 0.9 | 0.36 | 75 | 1.5 | 0.60 | 81 |
| | 4 | 350 | 0.6 | 0.21 | 83 | 0.95 | 0.33 | 88 |
| | 5 | 370 | 0.35 | 0.13 | 88 | 0.6 | 0.22 | 92 |

From the results in Table 11 it is apparent that by 5 successive settling and decantation operations it is possible to displace 88 and 92 percent of the dissolved magnesium and manganese, respectively, from the reacted pulp. In comparison when the pulp is filtered only 49 percent of the dissolved magnesium and manganese contained in the zinc depleted liquor contained in the reacted pulp is recovered in the filtrate. However the advantage achieved in terms of the increased recovery of dissolved magnesium and manganese is offset by a water balance disadvantage in that a total of 2 liters of water were used for displacement in the settling decantation tests. This water balance disadvantage can be greatly reduced by using a counter-current decantation procedure.

From the analyses for dissolved manganese and magnesium in the supernatants and the entrained solutions from each of the above settling tests, it can be shown that there was efficient mixing between entrained solution and water added at the commencement of each settling test. Consequently it can be shown by calculation that a three stage counter-current decantation procedure would displace at least 80% of the dissolved magnesium and manganese in the entrained solution using a volume of solution B as low as 1.25 times the volume of solution entrained in the solids S.

Thus the present results exemplify a procedure which may be used to minimise the amount of zinc depleted liquor Y returned to the zinc plant circuit with the calcine/basic zinc sulphate solids S. In the present example approximately 10 percent of the zinc depleted solution in the original pulp was contained in the pulp remaining after the fifth decantation. Decantation is therefore an effective method of displacement to maximise the control of the impurities such as magnesium and manganese in electrolytic zinc plants by minimising their return to the circuit with solids S.

EXAMPLE 7

Sequential use of calcium carbonate and bed calcine to maximise the rejection of manganese in selective zinc precipitation process filtrate Neutral solution from an electrolytic zinc plant circuit was diluted to a zinc concentration of 80.3 g/l. 4 liters of diluted solution was treated with 298 g of A.R. grade calcium carbonate for 2 hours at 90° C. in a 5 liter baffled beaker agitated at 500 rpm using a 7 cm diameter turbine impeller.

One half of the resulting pulp was filtered on a Buchner funnel yielding 1.37 liters of filtrate. 411 g of bed calcine of average particle size 10 μm was reacted for 4 hours at 90° C. with the filtrate in a baffled 3 liter beaker agitated at 500 rpm using a 5 cm diameter turbine impeller. The reacted pulp was filtered on a Buchner funnel.

The other half of the pulp resulting from the first stage calcium carbonate treatment was retained in the 5 liter baffled beaker and was reacted with 514 g of bed calcine for 4 hours at 90° C. The pulp was agitated initially at 500 rpm with a 7 cm diameter turbine impeller, but it was necessary to increase the agitation to 600 rpm as the reaction progressed in order to maintain a fluid pulp.

TABLE 12

Manganese rejection when calcium carbonate and bed calcine are used sequentially for Selective Zinc Precipitation.

| Origin of solution | | Solution Composition | |
|---|---|---|---|
| | | Zinc g/l | Manganese g/l |
| Initial solution | | 80 | 11.9 |
| After first stage treatment with calcium carbonate | | 21.4 | 10.6 |
| After second stage treatment with bed calcine | With interstage solids separation | 1.4 | 11.3 |
| | Without interstage solids separation | 1.2 | 7.6 |

Comparison of solution analyses for the above tests, shown in Table 12, indicates that calcium carbonate can be used to precipitate zinc with good selectivity, only 10.9 percent of the initial dissolved manganese being precipitated for a terminal zinc concentration of 21.4 g/l. After interstage solids separation bed calcine may then be used to precipitate additional zinc from the first stage filtrate with complete selectivity, a final zinc concentration of 1.4 g/l being achieved. (The slight increase in manganese concentration in the second stage is attributed to either solution concentration by evaporation during the test or alternatively to the dissolution of some manganese from bed calcine. Water additions were made during the test in an attempt to keep the pulp volume constant.) The results of experiment 1 in Example 2 indicated that manganese is decreased from 15.4 to 6.4 g/l when calcium carbonate is used to precipitate zinc from 84.4 to 1.3 g/l at 90° C. Thus the sequential use of calcium carbonate and bed calcine with interstage solids separation achieves more selective precipitation of zinc with respect to manganese than can be achieved using calcium carbonate as the only zinc precipitant under equavalent conditions.

The results in Table 12 show that the sequential use of calcium carbonate and bed calcine without interstage solids separation is less effective than the corresponding procedure with interstage solids separation. Nevertheless even without the use of interstage solids separation the sequential use of calcium carbonate and bed calcine is superior to the use of calcium carbonate alone, the overall precipitation of manganese being 36 and 58 percent, respectively. For the sequential use of calcium carbonate and bed calcine with interstage solids separation the overall precipitation of manganese was only 5.0 percent.

EXAMPLE 8

(a)

Calcine from the bed of a fluid bed roaster and zinc sulphate solution were fed continuously to a ball mill. The ground partly reacted pulp from the ball mill was fed continuously to the first reactor of a train of three reactors. The operating temperature in the ball mill and reactors was 90° C.

The solids S from the third reactor were filtered, at a temperature of 50°–60° C., on a 0.1 m$^2$ pressure filter fitted with a diaphragm to squeeze the filter cake. The filtration temperature was limited to $\leq 60°$ C. to avoid damaging the diaphragm. The moisture content, determined by oven drying the filter cake comprising solids S at 110° C., was 42% without any squeezing of the filter cake by the diaphragm. Subsequent squeezing to compress the cake at 1400 kPa for a minute reduced the moisture content from 42% to approximately 28%. The filter cake thickness was reduced by approximately 50% on squeezing indicating that the cake was highly compressible.

The moisture content of the filter cake was 43% when the solids S were produced in a subsequent identical experiment and filtered on a Buchner vacuum filter.

(b)

Bed calcine, obtained from the bed of a fluid bed roaster, was fed continuously via a belt feeder to an attrition mill. The mill consisted of a 6 liter cylindrical jacketed vessel containing the grinding media, which comprised approximately 5 kg of 6 mm diameter glass balls fluidised by a rotating centrally branched shaft as illustrated in FIG. 2 of a paper by J. A. Herbst and J. L. Sepulveda published in the Proceedings of the International Powder and Bulk Solids Handling Conference, Chicago, Illinois, 1978, p 452–70.

A solution containing 38.7 g Zn/l was also fed continuously to the mill in order to permit the reaction to proceed during size comminution. The experiment was performed at ambient temperature. Flowrates were adjusted to allow a residence time in the mill of approximately 1 hour.

When steady state had been achieved, samples of pulp were collected, and subjected to filtration tests using a pilot squeeze action pressure filter and a conventional laboratory Buchner filter. Product solids S were sized using a Warman Cyclosizer model M6.

The results are set out in Tables 13, 14 and 15 below.

TABLE 13

Size Analysis of Product Solids S

Product Solids S

| Fraction | Weight % |
|---|---|
| +25 μm | 1.6 |
| +17.9 to −25 μm | 0.9 |
| +12.4 to −17.9 μm | 1.4 |
| +8.6 to −12.4 μm | 2.8 |
| +6.3 to −8.6 μm | 3.3 |
| −6.3 μm | 90.0 |

The average particle size of the product solids is approximately 1 μm based upon a normal distribution.

TABLE 14

Filtration Data for the Separation of Solids S
Undertaken with Pulp at Ambient Temperature

| | Filter Type | |
|---|---|---|
| Variable | Vacuum Buchner | Pressure + Cake Squeezing |
| Cake thickness | 25 mm | 15–16 mm (Squeezed) |
| Zinc in primary filtrate | 6.2 g/l | 6.4 g/l |
| Filter cake moisture content | 57.3% | 36.8% |
| Total filtration time | 210 secs | 120 secs |

The Buchner filtration test was carried out on a 500 ml pulp sample using an 11 cm diameter funnel and Whatman filter paper No. 2 as the filter medium. The pressure filter had a filtration area of 0.1 m². The filter cycle including 60 seconds form time and 60 seconds squeezing to compress the cake at approximately 1450 kPa.

TABLE 15

Distribution of Impurity Components I

| Component | Calcine (%) | Concentration in Feed Solution | *Concentration in Process Filtrate | Percentage Dissolution of Component During Basic Zinc Sulphate Precipitation During Run |
|---|---|---|---|---|
| Mg | 0.16 | 2.1 g/l | 2.3 g/l | 70.9 |
| Mn | 0.50 | 4.9 g/l | 5.1 g/l | 10.9 |
| Cd | 0.14 | 0.1 mg/l | 277 mg/l | 83.1 |
| Na | 0.05 | 110 mg/l | 206 mg/l | 79.0 |
| Cl | 0.002 | 87 mg/l | 94 mg/l | |
| F | 0.001 | 3 mg/l | 4 mg/l | |

*Adjusted to correspond for comparison purposes to conditions of zero solution volume change during the course of the experiment.

The dissolution of Cl and F from calcine cannot be satisfactorily estimated from the analytical results. The maximum possible increase in the chlorine concentration, corresponding to the dissolution of all the chlorine present in calcine is 5 mg/l. For fluorine this figure is 2 mg/l. These levels fall within the limits of analytical accuracy at the concentrations present.

The results indicate significant dissolution of magnesium, cadmium and sodium and some dissolution of manganese from calcine during the precipitation of basic zinc sulphate. The above results indicate an increased dissolution of impurity compounds, in particular magnesium and manganese which is not usually dissolved during SZP, when calcine is ground to a very fine size in an attrition mill.

The use of pressure filtration caused a reduction in cake moisture content of the order of 36% when compared with conventional filtration. Obviously, filter cakes produced from in-situ grinding and reacting of calcine in an attrition mill are compressible.

EXAMPLE 9

A sample of bed calcine (Sample A) was obtained from a fluid bed roaster in which approximately 40% of the total product calcine reported in the bed. This type of fluid bed roaster has been described by R. Lightfoot (in the aforementioned paper). Another sample of bed calcine (Sample B) was obtained from a fluid bed roaster in which 80% of the calcine reports as bed material initially. However, as the remaining 20% of the calcine from boilers, cyclone etc is recycled the product calcine is exclusively bed material.

These calcine samples were ground in water until an average particle size of approximately 9 μm was attained.

The ground calcine samples were filtered, washed with one displacement of water and dried in an over before being used in SZP experiments. These experiments were carried out at 90° C. in a 5 liter baffled beaker with agitation provided by a 7 cm diameter turbine impeller rotating at 500 r.p.m.. 1.44 kg of dry calcine was added to 3.0 liter of a solution containing approximately 40 g Zn/l. The experimental results are given in Table 16.

TABLE 16

Kinetics of Zinc Precipitation using Ground Calcines A and B

| Time (mins) | Soluble Zinc Concentrations (g/l) | |
|---|---|---|
| | Sample A | Sample B |
| 0 | 41.6 | 40.6 |
| 5 | 21.8 | 23.0 |
| 10 | 19.4 | 14.1 |
| 30 | 13.0 | 4.5 |
| 60 | 10.9 | 2.8 |
| 360 | 4.6 | 1.4 |

The results in Table 16 indicate that calcine B precipitated dissolved zinc slightly more rapidly and completely than calcine A during the course of the experiment. Thus there is an advantage in using calcine formed in a similar manner to calcine B in that the entire calcine product is available for SZP where as it is usual for calcine A availability to be limited to between 30 and 70% of the total product calcine.

The moisture contents of the filter cakes obtained on filtering the 360 minute pulp samples were 38.5% for sample A and 43.7% for sample B. The higher moisture content for sample B is a consequence of the increased precipitation of zinc.

EXAMPLE 10

Process simulation modelling has been used to quantify the advantages of various modes of integrating SZP processes into electrolytic zinc plants. The base case comprises a circuit in which both calcined zinc concentrate and stockpiled zinc ferrite residue are treated, the latter in a residue treatment section in which iron is precipitated as a jarosite. Case 1, the base case, corresponds to FIG. 1 of a paper printed in Metallurgical Transactions B published by the American Society for Metals and the Metallurgical Society of A.I.M.E., Volume 11B, March 1980, pages 73-82, but in which the SZP plant is not operated, and the jarosite precipitate was washed with water.

For modelling purposes the zinc plant operation was characterised by the following conditions:

| Product: | 222,500 tonnes of cathode zinc |
|---|---|
| Feed Materials: | (i) Calcined zinc concentrate of composition; Zn 58.2%, Fe 8%, Mg 0.2%, Mn 0.75%. The amount of calcine used in the base case was 383,400 tonnes. |
| | (ii) Zinc ferrite residue of composition; Zn 22.4%, Fe 29.2%, Mg 0.1%, Mn 1.9%, of which 50,000 tonnes are added in each case. |
| | (iii) Limestone of composition; Mg 0.5%, Mn 0.012%. |

These materials are typical of feedstocks processed in an electrolytic zinc plant circuit. During the simulation modelling values were assumed for the extraction and precipitation of Zn, Fe, Mg, Mn etc. based on the observed behaviour of these components in a real electrolytic zinc plant operating in the base case mode. In the case of Mn additional factors affecting control which were simulated were the addition of manganese dioxide as a reagent within the process leaching and purification stages and the rejection of manganese as an oxide at the electrolytic cell anodes.

Spent electrolyte from zinc electrowinning was assumed to contain 110 g $H_2SO_4$/l.

Jarosite precipitate was washed with 1 m³ of wash liquor, water in the base case, per tonne of dry W/Zn free jarosite precipitate.

In cases where a SZP process was integrated into the electrolytic zinc plant circuit the zinc precipitant was used, unless otherwise stated, at the following rates:
(i) Calcine from the roaster bed was added at a rate of 2 times stoichiometric with respect to the amount of input dissolved zinc according to the reaction:

$$ZnSO_4 + 3ZnO + 7H_2O \rightarrow ZnSO_4 \cdot 3Zn(OH)_2 \cdot 4H_2O$$

where ZnO is the ZnO in calcine which is not combined with $Fe_2O_3$ zinc ferrite. Under these conditions the precipitated solids form a cake containing 42% moisture when separated on conventional vacuum filtration equipment (e.g. a disc or drum filter).
(ii) Limestone is added at a rate of 1.6 g/g of input dissolved zinc entering the SZP process reactors. Under these conditions the precipitated solids form a cake containing 40% moisture when separated on conventional vacuum filtration equipment.

In each instance that the use of a SZP plant is compared with the base case it is assumed that the dissolved zinc entering the SZP process or processes is 7.5% of the amount of zinc produced as cathodes.

A high value of the relative water balance in Table 17 indicates a superior zinc plant operating condition. For instance if the circuit was balanced for the Case 6 conditions it would be necessary to reject 4,800 m³/annum from the circuit for Case 1 conditions (e.g. by discarding solution; evaporation; replacing live steam heating by indirect heating etc.) or to add 82,200 m³/annum of water to the circuit in the Case 8 conditions. Every electrolytic zinc plant has a unique set of parameters defining its water balance. However, many of these plants experience water balance difficulties and on a relative basis the benefits indicated by the data in Table 17 can be obtained by implementing SZP according to the appropriate case.

Case 2 corresponds to the use of limestone for SZP in the mode shown in FIG. 1 of the aforesaid paper. The SZP process filtrate is discarded from the electrolytic zinc plant circuit. The data in Table 17 show that compared with Case 1 the introduction of a SZP process achieves a simultaneous improvement in magnesium, manganese and water balance control.

Case 3 corresponds to the use of limestone for SZP according to the flowsheet shown in FIG. 2 of the aforesaid paper, except that in order to treat 7.5% of the dissolved zinc in a SZP process it is necessary to treat some neutral zinc plant solution, in addition to all the jarosite wash filtrate. The most important feature of Case 3 is that the SZP process filtrate is used to wash jarosite (i.e. a closed circuit washing mode is used). The data in Table 17 indicates that the magnesium and water balance control are improved compared with Case 2.

Case 4 corresponds to Case 2 except in that limestone had been replaced with bed calcine ground to an average particle size of approximately 10 μm in a ball mill reactor. The results in Table 17 indicate that the replacement of limestone with bed calcine achieves superior manganese control, slightly inferior, but nevertheless effective magnesium control, and a relatively unsatisfactory water balance control situation.

The method of simulation modelling used to quantify Cases 1 to 4 above is different and significantly more sophisticated than the procedure used in the aforementioned paper.

TABLE 17

| | Comparison of SZP Strategies | | | | |
|---|---|---|---|---|---|
| | Weight of zinc precipitant for selective zinc precipation | | Pure Solution | | Relative |
| Case No | Bed Calcine (tonne/annum) | Limestone (tonne/annum) | Mg g/l | Mn g/l | Water Balance m³/annum |
| 1 | 0 | 0 | 35.6 | 17.5 | 0 |
| 2 | 0 | 26,700 | 6.8 | 16.4 | 70,900 |
| 3 | 0 | 26,700 | 6.3 | 16.9 | 150,900 |
| 4 | 191,700 | 0 | 8.5 | 12.6 | −58,400 |
| 5 | 143,800 | 0 | 13.6 | 14.6 | −252,500 |
| 6 | 191,700 | 0 | 8.9 | 12.8 | 4,800 |
| 7 | 191,700 | 0 | 6.4 | 11.4 | 81,600 |
| 8 | 191,700 | 0 | 6.2 | 11.2 | 87,000 |
| 9 | 134,200 | 0 | 11.3 | 13.8 | −71,000 |
| 10 | 134,200 | 0 | 7.0 | 11.5 | 69,700 |

The Cases 1 to 4 in this example correspond to the first four Cases in Table 1 which is based on the aforementioned paper. The correspondence between the relative magnitudes of magnesium and water balance control is excellent despite the use of different process conditions and a different method of process simulation modelling in the present case.

Under Case 4 conditions 50% of the calcine was used for selective zinc precipitation, a value approaching the limiting availability of bed calcine in most fluid bed roasting operations. If the average particle size of the ground bed calcine is appreciably greater than 10 μm a greater than 2× stoichiometric addition of bed calcine is required. As Case 4 represents the limiting availability of bed calcine, operation with less efficient grinding of bed calcine will require a decrease in the amount of dissolved zinc input to SZP. For instance at 50% bed calcine availability and an average ground calcine particle size of 150 μm it would only be possible to treat 3.6% of the dissolved zinc compared with 7.5% in Cases 1 to 4. Consequently the control of magnesium and other impurities would be inadequate.

Case 5 is similar to Case 4 except that the calcine is ground in a ball mill to an average particle size of 2.5 μm. As a consequence of decreasing the average calcine particle size it is possible to decrease the rate of calcine addition to 1.5× stoichiometric, but there is an increase in the moisture content of the solids S to 65%. The results in Table 17 show that the increased fineness of the ground calcine leads to less satisfactory control of magnesium and manganese and to a totally unsatisfactory water balance condition.

Cases 2, 4 and 5 involve the discard of 116,200 m³/annum of SZP process filtrate containing approximately 1 g Zn/l to an effluent treatment plant. Cases 3, 6, 7, 8, 9 and 10 involve the closed circuit washing of jarosite and no SZP process filtrate is discarded.

Case 6 involves the use of bed calcine ground to an average size of 10 μm in a ball mill reactor and a flowsheet involving the closed circuit washing of jarosite. Thus Case 6 is analogous to Case 3 except that ground bed calcine replaces limestone as the zinc precipitant in the SZP process. Although magnesium and manganese control are substantially unchanged the water balance is considerably improved compared with Case 4.

Case 7 is equivalent to Case 6 and involves the use of bed calcine ground to an average size of 10 μm in a closed circuit washing operation, except in that the SZP solids are separated on a vacuum filter and washed with 0.5 displacements of neutral zinc plant solution. The corresponding filter cake solids in Case 6 are unwashed. The results in Table 17 indicate that implementation of displacement washing achieves a considerable simultaneous improvement in both magnesium, manganese and water balance control compared with Case 6.

Case 8 is equivalent to Case 6 except that the solids are separated using a pressure filter with a squeeze action. Consequently the resultant cake has a moisture content of 28% as opposed to the 42% moisture content obtained by conventional vacuum filtration in Case 6. Table 17 shows that the use of a pressure filter with cake squeezing to decrease the cake moisture content from 42 to 28% achieves approximately equal benefits in magnesium, manganese and water balance control to the use of a 0.5 displacement cake wash as in Case 7. Case 9 is equivalent to Case 6, in that bed calcine is used for SZP in a closed circuit jarosite washing operation. However, in Case 9 the bed calcine is ground in an attrition mill to an average size of 1 μm. Under these conditions the stoichiometric calcine addition rate can be decreased from 2.0 to 1.4 times. The resultant solids are separated by vacuum filtration as an unwashed cake containing 57% moisture. Table 17 shows that while considerable magnesium and manganese control is achieved, the control of both these impurities and water balance is inferior to both Cases 4 and 6. However, if the solids S are separated using a pressure filter with a diaphragm which forms a squeezed unwashed cake with a 37% moisture content as in Case 10 of Table 17, considerable additional magnesium, manganese and water balance control is achieved. Indeed, Table 17 shows that the impurity and water balance control is approximately comparable to that in Case 8. The difference between Cases 8 and 10 is that the bed calcine is ground to 10 μm and 1 μm average particle size, respectively. Normally, as exemplified by Case 5, it is not possible to achieve an acceptable water balance when bed calcine is ground to <5 μm average particle size. However, the use of a pressure filter with cake squeezing affords considerable water balance benefit as exemplified by Case 10, making operation with very fine grinding of calcine viable and affording the additional benefit that the amount of bed calcine required for selective zinc precipitation is decreased by 30%. The lower moisture content of 57% for the vacuum filtered solids S produced by attrition milling in Case 9 compared to 65% for ball milling as in Case 5 indicates that attrition milling is a preferred method of producing very fine ground calcine.

It will clearly be understood that the invention in its general aspects is not limited to the specific details referred to hereinabove.

We claim:

1. In a process for controlling the water balance and the concentration of impurity (I) in an electrolytic zinc plant circuit in which zinc is precipitated from an aqueous solution (A) containing zinc sulphate using a compound (R) containing zinc oxide as the precipitant in a selective zinc precipitation (SZP) process plant, thereby producing precipitated solids (S) containing basic zinc sulphate and a zinc depleted solution (Y), the solids (S) being returned to the said circuit, and where the impurity I comprises at least one member of the group magnesium, manganese, chloride, sodium, and potassium, the improvement which comprises reducing the volume of zinc depleted solution Y returned daily to the said circuit in association with the solids S by using a compound R which has an average particle size in the range of 5 to 150 μm.

2. A process according to claim 1 further comprising precipitating portion of the zinc present in solution A using a compound containing calcium carbonate as the precipitant in a SZP process plant to give a partially zinc depleted solution containing at least 5 gram of zinc per liter which therefore requires subsequently less of the compound R containing zinc oxide to precipitate sufficient of the remaining zinc to achieve a concentration of less than 10 gram of zinc per liter in solution.

3. A process according to claim 1 further comprising:
taking solids from a step in which zinc is precipitated in a SZP process plant into a solids-liquid separation system in which zinc depleted solution associated with the said solids taken from said step is displaced by a solution (B) drawn from the said circuit, the solids-liquid separation system comprising:
(i) filtration with washing of the filter cake by solution B, or
(ii) thickening with counter-current decantation washing of the thickened solids by solution B, or (iii) settlement of the said solids into solution B which flows through the lower section of a solids transfer column.

4. A process according to claim 3 further comprising precipitating portion of the zinc present in solution A using a compound containing calcium carbonate as the precipitant in a SZP process plant to give a partially zinc depleted solution containing at least 5 gram of zinc per liter which therefore requires subsequently less of the compound R containing zinc oxide to precipitate sufficient of the remaining zinc to achieve a concentration of less than 10 gram of zinc per liter in solution.

5. A process according to claim 1 in which the compound R is formed from input materials to the said circuit which have the highest concentration of Impurity I.

6. A process according to claim 3 in which solution B contains in excess of 50 grams of zinc per liter.

7. A process according to claim 2 in which said partially zinc depleted solution contains at least 10 gram of zinc per liter in order to minimise manganese precipitation in the first stage of the SZP process plant.

8. A process according to claim 1 in which solution Y is discarded or used to wash solids from the electrolytic zinc plant circuit and in which solution Y contains less than 5 gram of zinc per liter in order to minimise the loss of dissolved zinc when solution Y is discarded or so used.

9. A process according to claim 1 in which the compound R has an average particle size in the range of 7 to 32 μm.

10. A process according to claim 1 in which compound R has an average particle size of approximately 10 μm.

11. A process according to claim 1 in which the compound R is formed by roasting zinc concentrate in a manner such that the amount of compound R which reports in the bed of the roaster is increased, such that the entire roasted product ultimately reports in the bed of the roaster.

12. In a process for controlling the water balance and the concentration of impurity (I) in an electrolytic zinc plant circuit in which zinc is precipitated from an aqueous solution (A) containing zinc sulphate using a compound (R) containing zinc oxide as the precipitant in a selective zinc precipitation (SZP) process plant, thereby producing precipitated solids (S) containing basic zinc sulphate and a zinc depleted solution (Y), the solids S being returned to the said circuit, and where the impurity I comprises at least one member of the group magnesium, manganese, chloride, sodium, and potassium, the improvement which comprises reducing the volume of zinc depleted solution Y returned daily to the said circuit in association with the solids S by using a compound R which has an average particle size in the range 0.5 to 150 μm, said solids S being separated by a filtration method which compresses said solids before discharge in order to minimise the amount of entrained SZP solution (Y) which is returned to the circuit with the solids.

13. A process according to claim 1 in which zinc depleted solution Y is used for washing solids arising from the said circuit, thereby producing an aqueous wash solution with an increased zinc sulphate concentration, and in which greater than 10 percent of the said aqueous wash solution becomes solution A, thereby achieving at least a partially closed washing circuit.

* * * * *

UNITED STATES PATENT AND TRADEMARK OFFICE
CERTIFICATE OF CORRECTION

PATENT NO. : 4,437,953  
DATED : March 20, 1984  
INVENTOR(S) : Oliver Michael G. Newman; David J. Palmer; Robert V. Pammenter Page 1 of 4

It is certified that error appears in the above—identified patent and that said Letters Patent is hereby corrected as shown below:

Title page after the filing data, please insert -- [30] Foreign Application Priority Data: Australian Provisional Specifications PE9166, of June 2, 1981 and PE 9234, of June 10, 1981 --.

| | | |
|---|---|---|
| Column 1 | line 19 | Change "thwe" to -- the -- |
| | line 31 | Change "=" to -- 32 -- |
| | line 68 | Change "ashing" to -- washing -- |
| Column 2 | line 18 | Change "fom" to -- from -- |
| | line 35 | Change "50" to -- 150 -- |
| | line 37 | Change "disdcharge " to -- discharge -- |
| | line 44 | Insert space between "ultimately" and "reports" |
| | line 53 | Change "cicuit" to -- circuit -- |
| | line 62 | Change "satisfactoy" to -- satisfactory -- |
| | line 63 | Change "was" to -- wash -- |
| Column 3 | line 34 | Change "selectiely" to -- selectively -- |
| | line 52 | Insert -- . -- between "3Zn(OH)$_2$" and "4" |
| | line 64 | Insert space between "the" and "Selective" |
| Column 4 | line 1 | Change "preferred" to -- referred -- |
| | line 32 | Insert -- from a high acid leaching step in a residue -- between "residue" and "treatment" such that the line reads "residue from a high acid leaching step in a residue treatment process are examples of such solids" |
| | line 45 | Change "mwethod" to -- method -- |
| | line 46 | Change "decycle" to -- recycle -- |
| | line 64 | Change "I" to -- 1 -- |

UNITED STATES PATENT AND TRADEMARK OFFICE
CERTIFICATE OF CORRECTION

PATENT NO. : 4,437,953

DATED : March 20, 1984

INVENTOR(S) : Oliver Michael Griffiths, Newman; David John Palmer; Robert Vivian Pammenter It is certified that error appears in the above—identified patent and that said Letters Patent is hereby corrected as shown below:

| | | |
|---|---|---|
| Column 6 | line 39 | Change "under" to -- upon -- |
| | line 46 | Change "concentraion" to -- concentration -- |
| | line 47 | Change "alcine" to -- calcine -- |
| Column 7 | line 27 | Change "about" to -- above -- |
| | line 59 | Change "XII" to -- XI -- |
| Column 8 | Line 35 | Change "syste" to -- system -- |
| | line 46 | Insert -- its -- between "prevent" and "use" |
| Column 9 | line 21 | Change "filers" to -- filters -- |
| | line 45 | Change "viccosity" to -- viscosity -- |
| Column 10 | line 13 | Change "withodrawl" to -- withdrawal -- |
| | line 26 | Change "is" to -- in -- |
| | line 48 | Change "his" to -- this -- |
| Column 11 | line 12 | Insert space between "fluid" and "bed" |
| | line 13 | Change "that the" to -- than that -- |
| | line 32 | Change "increase" to -- increases -- |
| | line 42 | change "company'" to -- compound -- |
| | line 66 | Insert -- a -- between "accompanying" and "given" |
| | line 68 | Change "and" to -- an -- |
| Column 12 | line 9 | Change "accompaning" to -- accompanying -- |
| | line 13 | Change "increaes" to -- increases -- |
| | line 19 | Change "remoe" to -- remove -- |
| | line 45 | Insert -- bed -- between "fluid" and "roaster" |
| | line 48 | Insert comma between "Erzmetall" and "Volume" |

UNITED STATES PATENT AND TRADEMARK OFFICE
CERTIFICATE OF CORRECTION

PATENT NO. : 4,437,953  Page 3 of 4

DATED : March 20, 1984

INVENTOR(S) : Oliver M.G. Newman; David J. Palmer; Robert V. Pammenter

It is certified that error appears in the above—identified patent and that said Letters Patent is hereby corrected as shown below:

| | | |
|---|---|---|
| Column 12 | line 66 | Change "roater" to -- roaster -- |
| Column 13 | line 9 | Change "deplected" to -- depleted |
| | line 52 | Change "$X_1$" to -- XI -- |
| Column 16 | line 45 | Change "caIcium" to -- calcium -- |
| Column 21 | line 5 | Change "ihto" to -- into -- |
| Column 23 | line 40 | Change "were" to -- with -- |
| Column 25 | line 9 | Change "as" to -- was -- |
| | line 38 | 4th column change "3.2" to -- 3.0 -- |
| Column 28 | line 8 | Change "equavalent" to -- equivalent -- |
| Column 30 | line 19 | Change "over" to -- oven -- |
| Column 31 | line 57 | Insert -- as -- between "$Fe_2O_3$" and "zinc ferrite" |
| Column 33 | line 38 | Change "zine" to -- zinc -- |
| Column 34 | line 39 | Delete parenthesis around "S" |

UNITED STATES PATENT AND TRADEMARK OFFICE
CERTIFICATE OF CORRECTION

PATENT NO. : 4,437,953            Page 4 of 4

DATED      : March 20, 1984

INVENTOR(S) : Oliver M.G. Newman; David J. Palmer; Robert V. Pammenter

It is certified that error appears in the above-identified patent and that said Letters Patent is hereby corrected as shown below:

Column 35     line 15     Change "Impurity" to -- impurity --

Column 36     line 25     Delete parenthesis around "Y"

*Signed and Sealed this*

*Twenty-fifth* Day of *December 1984*

[SEAL]

*Attest:*

*Attesting Officer*

GERALD J. MOSSINGHOFF

*Commissioner of Patents and Trademarks*